United States Patent
Xu et al.

(10) Patent No.: US 12,026,192 B2
(45) Date of Patent: Jul. 2, 2024

(54) IMAGE RETRIEVAL METHOD, IMAGE RETRIEVAL DEVICES, IMAGE RETRIEVAL SYSTEM AND IMAGE DISPLAY SYSTEM

(71) Applicant: BOE TECHNOLOGY GROUP CO., LTD., Beijing (CN)

(72) Inventors: Jingtao Xu, Beijing (CN); Shaonan Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 42 days.

(21) Appl. No.: 17/781,093

(22) PCT Filed: Apr. 30, 2021

(86) PCT No.: PCT/CN2021/091308
§ 371 (c)(1),
(2) Date: May 31, 2022

(87) PCT Pub. No.: WO2021/219117
PCT Pub. Date: Nov. 4, 2021

(65) Prior Publication Data
US 2023/0004595 A1    Jan. 5, 2023

(30) Foreign Application Priority Data

Apr. 30, 2020    (CN) .......................... 202010368319.5

(51) Int. Cl.
*G06F 7/00* (2006.01)
*G06F 16/532* (2019.01)
(Continued)

(52) U.S. Cl.
CPC .......... *G06F 16/532* (2019.01); *G06F 16/538* (2019.01); *G06F 16/583* (2019.01); *G06V 10/40* (2022.01); *G06V 10/774* (2022.01)

(58) Field of Classification Search
CPC .... G06F 16/532; G06F 16/583; G06F 16/538; G06V 10/40; G06V 10/774
(Continued)

(56) References Cited

U.S. PATENT DOCUMENTS

| 2019/0147292 | A1 | 5/2019 | Watanabe et al. |
| 2019/0180101 | A1 | 6/2019 | Li et al. |
| 2020/0160099 | A1* | 5/2020 | Chen ..................... G06F 18/214 |

FOREIGN PATENT DOCUMENTS

| CN | 107885861 A | 4/2018 |
| CN | 110209866 A | 9/2019 |

(Continued)

*Primary Examiner* — Isaac M Woo
(74) *Attorney, Agent, or Firm* — IP & T GROUP LLP

(57) ABSTRACT

An image retrieval method, an image retrieval device, and an image retrieval system, which are used for image retrieval, are provided. The image retrieval method comprises: receiving a first original image (S100); extracting an image feature of the first original image to obtain a first feature code (S200); obtaining first target information according to the first feature code (S300); according to the first target information, searching for a first target painting set corresponding to the first target information in at least one of a painting library and a knowledge graph library, so as to obtain the first target painting set (S400); and outputting the first target painting set (S500).

18 Claims, 9 Drawing Sheets

Acquire a first feature code library corresponding to the painting library and a second feature code library corresponding to the knowledge graph library; the first feature code library and the second feature code library are obtained by respectively performing image feature extractions on images in the painting library and images in the knowledge graph library using the first image feature extraction model — S310

Calculate a distance between the first feature code and each feature code in the first feature code library and the second feature code library, acquire feature codes corresponding to distances in a preset range and take all acquired feature codes as a first target feature code set — S320

Determine the first target information according to the first target feature code set — S330

(51) Int. Cl.
　　　*G06F 16/538*　　　(2019.01)
　　　*G06F 16/583*　　　(2019.01)
　　　*G06V 10/40*　　　(2022.01)
　　　*G06V 10/774*　　(2022.01)
(58) Field of Classification Search
　　　USPC .................................................. 707/600–899
　　　See application file for complete search history.

(56) References Cited

FOREIGN PATENT DOCUMENTS

| | | |
|---|---|---|
| CN | 110688516 A | 1/2020 |
| CN | 111581421 A | 8/2020 |

\* cited by examiner

IMAGE RETRIEVAL METHOD, IMAGE RETRIEVAL DEVICES, IMAGE RETRIEVAL SYSTEM AND IMAGE DISPLAY SYSTEM

CROSS-REFERENCE TO RELATED APPLICATIONS

This application is a national phase entry under 35 USC 371 of International Patent Application No. PCT/CN2021/091308, filed on Apr. 30, 2021, which claims priority to Chinese Patent Application No. 202010368319.5, filed on Apr. 30, 2020, which are incorporated herein by reference in their entirety.

TECHNICAL FIELD

The present disclosure relates to the field of image processing technologies, and in particular, to an image retrieval method, image retrieval devices, an image retrieval system, an image display system, and a computer readable storage medium.

BACKGROUND

A painting screen is able to display images (a painting is considered as an example herein) and restore a true texture of the painting, and thus it has been widely used.

A user may enter a text description (e.g., a name or an author of a painting) of relevant information of the painting, so that a corresponding painting can be displayed on the painting screen for the user to appreciate. However, in a case where the user finds a condition that relevant information such as a name and an author of a painting is unknown, it is difficult for the user to directly retrieve and display the painting through the painting screen, and it is also difficult for the user to know about information of the painting.

SUMMARY

In a first aspect, an image retrieval method is provided. The image retrieval method includes: receiving a first original image; extracting an image feature of the first original image to obtain a first feature code; obtaining first target information according to the first feature code; searching in at least one of a painting library and a knowledge graph library for a first target painting set corresponding to the first target information according to the first target information, so as to obtain the first target painting set; and outputting the first target painting set.

In some embodiments, extracting the image feature of the first original image to obtain the first feature code, includes: extracting the image feature of the first original image using a first image feature extraction model to obtain the first feature code.

The image retrieval method further includes: acquiring operation information of a user in response to an operation of the user on the first target painting set; updating the first image feature extraction model according to the operation information of the user to obtain a second image feature extraction model; receiving a second original image; extracting an image feature of the second original image using the second image feature extraction model to obtain a second feature code; obtaining second target information according to the second feature code; searching in the painting library and the knowledge graph library for a second target painting set corresponding to the second target information according to the second target information, so as to obtain the second target painting set; and outputting the second target painting set.

In some embodiments, updating the first image feature extraction model according to the operation information of the user to obtain the second image feature extraction model, includes: classifying the operation information of the user; calculating a proportion of operation information of the user corresponding to each type of label; adjusting a weight of an image feature corresponding to each type of label according to the proportion of the operation information of the user corresponding to each type of label; forming the second image feature extraction model by training according to the first image feature extraction model and the adjusted weight; and replacing the first image feature extraction model with the second image feature extraction model.

In some embodiments, obtaining the first target information according to the first feature code, includes: calculating a distance between the first feature code and each feature code in a first feature code library and a second feature code library; acquiring feature codes corresponding to distances in a preset range and taking the acquired feature codes as a first target feature code set; and determining the first target information according to the first target feature code set. The first feature code library is a feature code library obtained by performing an image feature extraction on a plurality of images in the painting library using a first image feature extraction model; and the second feature code library is a feature code library obtained by performing an image feature extraction on a plurality of images in the knowledge graph library using the first image feature extraction model.

In some embodiments, obtaining the second target information according to the second feature code, includes: calculating a distance between the second feature code and each feature code in a third feature code library and a fourth feature code library; acquiring feature codes corresponding to distances in a preset range and taking the acquired feature codes as a second target feature code set; and determining the second target information according to the second target feature code set. The third feature code library is a feature code library obtained by performing an image feature extraction on a plurality of images in the painting library using the second image feature extraction model; and the fourth feature code library is a feature code library obtained by performing the image feature extraction on a plurality of images in the knowledge graph library using the second image feature extraction model.

In some embodiments, searching in the at least one of the painting library and the knowledge graph library for the first target painting set corresponding to the first target information according to the first target information, so as to obtain the first target painting set, includes: searching in the painting library according to the first target information to obtain a first search result; searching in the knowledge graph library according to the first target information to obtain a second search result; if the first search result includes a hit painting, taking the first search result as the first target painting set, the hit painting being a painting with a highest similarity to the first original image among paintings corresponding to the first target information; if the first search result does not include the hit painting and the second search result includes the hit painting, taking the first search result and the hit painting together as the first target painting set; and if neither the first search result nor the second search result includes the hit painting, taking the first search result as the first target painting set.

In some embodiments, searching in the at least one of the painting library and the knowledge graph library for the first target painting set corresponding to the first target information according to the first target information, so as to obtain the first target painting set, includes: searching in the painting library according to the first target information to obtain a first search result; searching in the knowledge graph library according to the first target information to obtain a second search result; if the first search result and the second search result are same, taking the first search result as the first target painting set; and if the first search result and the second search result are not completely same, taking a union set of the first search result and the second search result as the first target painting set.

In a second aspect, an image retrieval device is provided. The image retrieval device is configured to perform the image retrieval method as described in any of the above embodiments. The image retrieval device includes a processor and a memory. The memory stores program instructions, and the program instructions are executed by the processor.

In a third aspect, an image retrieval device is provided. The image retrieval device has stored a painting library and a knowledge graph library therein, and includes a first server and a second server. The first server is configured to: receive a first original image and send the first original image to the second server. The second server is configured to: receive the first original image sent by the first server; extract an image feature of the first original image to obtain a first feature code; and obtain first target information according to the first feature code and transmit the first target information to the first server. The first server is further configured to: receive the first target information transmitted by the second server; search in at least one of a painting library and a knowledge graph library for a first target painting set corresponding to the first target information according to the first target information, so as to obtain the first target painting set; and output the first target painting set.

In some embodiments, the first server is further configured to perform data processing on the received first original image and send the data-processed first original image to the second server.

In some embodiments, the second server is further configured to: extract the image feature of the first original image using a first image feature extraction model to obtain the first feature code.

In some embodiments, the second server is further configured to: acquire operation information of a user in response to an operation of the user on the first target painting set; and update a first image feature extraction model according to the operation information of the user to obtain a second image feature extraction model. The first server is further configured to: receive a second original image and send the second original image to the second server. The second server is further configured to: extract an image feature of the second original image using the second image feature extraction model to obtain a second feature code; obtain second target information according to the second feature code; and transmit the second target information to the first server. The first server is further configured to: search in the painting library and the knowledge graph library for a second target painting set corresponding to the second target information according to the second target information, so as to obtain the second target painting set; and output the second target painting set.

In some embodiments, the second server is further configured to: classify the operation information of the user and calculate a proportion of operation information of the user corresponding to each type of label; adjust a weight of an image feature corresponding to each type of label according to the proportion of the operation information of the user corresponding to each type of label; form the second image feature extraction model by training according to the first image feature extraction model and an image feature, a weight of which is adjusted; and replace the first image feature extraction model with the second image feature extraction model.

In some embodiments, the first server is further configured to: search in the painting library according to the first target information to obtain a first search result; search in the knowledge graph library according to the first target information to obtain a second search result; in the case where the first search result includes a hit painting that is a painting with a highest similarity to the first original image among paintings corresponding to the first target information, take the first search result as the first target painting set; in the case where the first search result does not include the hit painting and the second search result includes the hit painting, take the first search result and the hit painting together as the first target painting set; and in the case where neither the first search result nor the second search result includes the hit painting, take the first search result as the first target painting set.

In some embodiments, the first server is further configured to: search in the painting library according to the first target information to obtain a first search result; search in the knowledge graph library according to the first target information to obtain a second search result; in the case where the first search result and the second search result are same, take the first search result as the first target painting set; and in the case where the first search result and the second search result are not completely same, take a union set of the first search result and the second search result as the first target painting set.

In a fourth aspect, an image retrieval system is provided. The image retrieval system includes an image retrieval device and a terminal device. The image retrieval device is configured to perform the image retrieval method as described in any of the above embodiments. The terminal device is configured to capture the first original image and upload the first original image to the image retrieval device, receive the first target painting set output by the image retrieval device, and display the first target painting set in response to an operation of a user.

In a fifth aspect, an image display system is provided. The image display system includes an image retrieval device, a terminal device and a painting display terminal. The image retrieval device is configured to perform the image retrieval method as described in any of the above embodiments. The terminal device is configured to capture the first original image and upload the first original image to the image retrieval device, receive the first target painting set output by the image retrieval device, and output the first target painting set to the painting display terminal in response to an operation of a user. The painting display terminal is configured to display the first target painting set.

In a sixth aspect, a non-transitory computer-readable storage medium is provided. The non-transitory computer-readable storage medium has stored thereon computer program instructions that, when run on a processor, cause the processor to perform the image retrieval method as described in any of the above embodiments.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these drawings. In addition, the accompanying drawings in the following description may be regarded as schematic diagrams, and are not limitations on actual sizes of products, actual processes of methods and actual timings of signals involved in the embodiments of the present disclosure.

DETAILED DESCRIPTION

Figure 1:
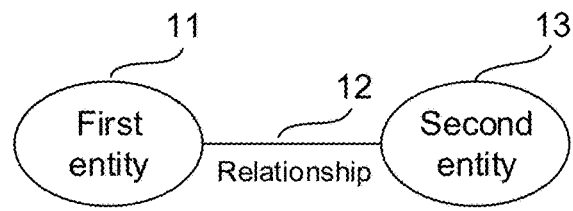
FIG. 1 is a structural diagram of a knowledge graph, in accordance with some embodiments of the present disclosure.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as open and inclusive, i.e., "including, but not limited to". In the description of the specification, the terms such as "one embodiment", "some embodiments", "exemplary embodiments", "example", "specific example" and "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as "first" and "second" are used for descriptive purposes only, and are not to be construed as indicating or implying the relative importance or implicitly indicating the number of indicated technical features. Thus, features defined by "first" and "second" may explicitly or implicitly include one or more of the features. In the description of the embodiments of the present disclosure, "a plurality of" or "the plurality of" means two or more unless otherwise specified.

In the description of some embodiments, terms such as "coupled" and "connected" and their extensions may be used. For example, the term "connected" may be used in the description of some embodiments to indicate that two or more components are in direct physical or electrical contact with each other. As another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining" or "in response to detecting", depending on the context. Similarly, the phrase "if it is determined" or "if [a stated condition or event] is detected" is optionally construed as "in a case where it is determined that" or "in response to determining that" or "in a case where [the stated condition or event] is detected" or "in response to detecting [the stated condition or event]", depending on the context.

The usage of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, the term such as "about", "substantially" or "approximately" includes a stated value and an average value within an acceptable range of deviation of a particular value. The acceptable range of deviation is determined by a person of ordinary skill in the art in view of the measurement in question and errors associated with the measurement of a particular quantity (i.e., the limitations of the measurement system).

Some embodiments of the present disclosure provide an image retrieval method. Technical elements involved in the image retrieval method are schematically described below.

Knowledge Graph (KG)

The knowledge graph is a structured semantic knowledge base, and basic component units thereof include a first entity, a relationship and a second entity.

The knowledge graph is generally composed of a plurality of nodes and a plurality of edges, each node represents the first entity or the second entity, and each edge represents the relationship. In the knowledge graph, the plurality of edges connect all nodes to form a net structure. Each node corresponds to a unique identification, and each edge corresponds to a relationship. The knowledge graph can be applied to relevant scenarios such as knowledge inference, searching, question and answer, and can give accurate and elaborative answers.

For example, as shown in FIG. 1, FIG. 1 shows a basic structure of the knowledge graph. The knowledge graph includes a first node 11 and a second node 13, and the first node 11 and the second node 13 are connected through an edge 12. Here, the first node 11 represents the first entity, the edge 12 represents the relationship, and the second node 13 represents the second entity. The first node 11, the edge 12 and the second node 13 form a three-tuple structure of "the first entity, the relationship and the second entity".

For example, as shown in FIG. 1, the first entity may be a person name, a place name or the like, and the second entity may be a person name, a place name or the like. The relationship may be a father-child relationship, a mother-child relationship, a spouse relationship or an affiliation of geographical regions, etc.

Figure 2:
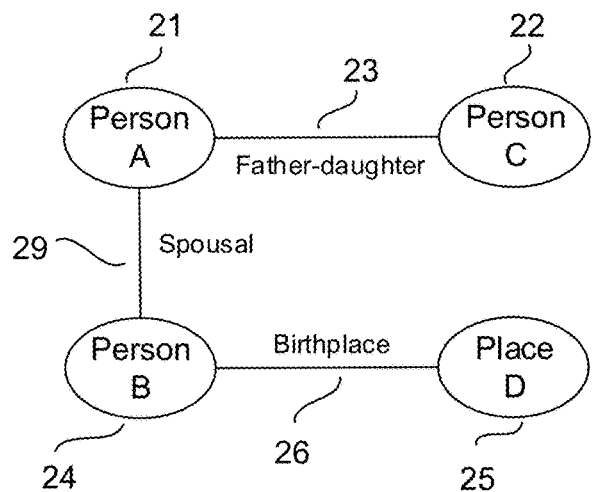
FIG. 2 is a structural diagram of another knowledge graph, in accordance with some embodiments of the present disclosure.

It will be seen from FIG. 2 that a person A and a person C have a father-daughter relationship, that is, the person A corresponds to the person C through the father-daughter relationship. Here, in the person A and the person C, the person A is the first entity and the person C is the second entity; alternatively, the person C is the first entity and the person A is the second entity.

It will be seen from FIG. 2 that the person A and a person B have the spouse relationship, that is, the person A corresponds to the person B through the spouse relationship. Here, in the person A and the person B, the person A is the first entity and the person B is the second entity; alternatively, the person B is the first entity and the person A is the second entity.

It will be seen from FIG. 2 that the person B and a place D have a birthplace relationship, that is, the person B corresponds to the place D through the birthplace relationship. Here, in the person B and the place D, the person B is the first entity and the place D is the second entity.

Figure 3:
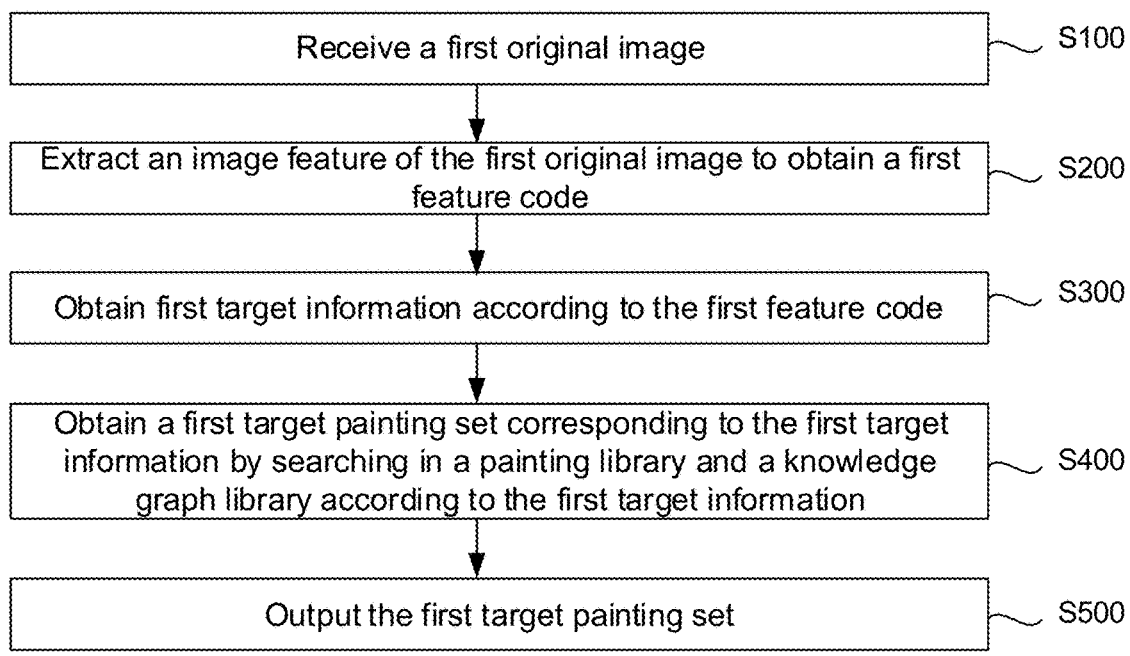
FIG. 3 is a flow diagram of an image retrieval method, in accordance with some embodiments of the present disclosure.

As shown in FIG. 3, the image retrieval method provided by some embodiments of the present disclosure includes S100 to S500.

In S100, a first original image is received.

In some examples, before the S100, the image retrieval method further includes: capturing the first original image by a terminal device. For example, the first original image is shot by the terminal device.

For example, a captured object corresponding to the first original image includes a plurality of types of sources. For example, the captured object may come from an image displayed on a certain electronic display apparatus (e.g., a television), or come from a print (e.g., a poster, a magazine or a calendar).

For example, a subject of receiving the first original image and retrieving images according to the first original image may be an image retrieval device.

In S200, an image feature of the first original image is extracted to obtain a first feature code.

In some examples, the image feature includes a plurality of categories. For example, the image feature may include categories of color, shape (e.g., plant shape or animal shape, etc.), texture, type or time. Each category corresponds to a label and represents a dimensionality of the image feature. Therefore, it can also be said that the image feature has a plurality of dimensionalities.

In some examples, after the image feature of the first original image is extracted, a dimensionality reduction and a Hash quantization may be performed on the image feature to obtain the first feature code. For example, the first feature code is a string of numbers in binary, a length of which may be set according to a complexity of the image feature of the first original image. For example, the first feature code may be 2048-dimensional, 1024-dimensional or 512-dimensional.

In some examples, in the S200, extracting the image feature of the first original image to obtain the first feature code, includes: extracting the image feature of the first original image using a first image feature extraction model to obtain the first feature code.

For example, the first image feature extraction model may be a feature extraction model of a deep learning model.

In S300, first target information is obtained according to the first feature code.

The first target information is information that can correspond to at least one image in the painting library and/or the knowledge graph library. For example, the first target information may include identifications (e.g., names, serial numbers, store addresses and the like, the following will take the names or the store addresses as an example) of images, each name corresponds to a unique image in the painting library and/or the knowledge graph library.

Figure 4:
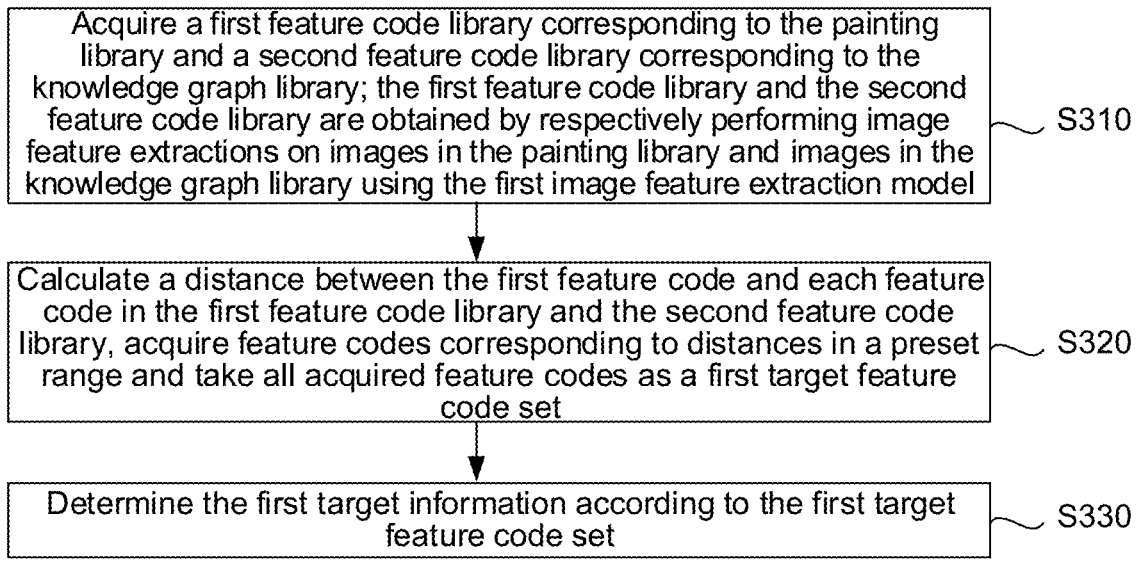
FIG. 4 is a flow diagram of S300 in the image retrieval method shown in FIG. 3.

In some examples, as shown in FIG. 4, in S300, obtaining the first target information according to the first feature code, includes S310 to S330.

In S310, a first feature code library corresponding to the painting library and a second feature code library corresponding to the knowledge graph library are acquired. The first feature code library and the second feature code library are obtained by respectively performing image feature extractions on images in the painting library and images in the knowledge graph library using the first image feature extraction model. For example, the first feature code library is a feature code library obtained by performing an image feature extraction on a plurality of images in the painting library using the first image feature extraction model, and the second feature code library is a feature code library obtained by performing the image feature extraction on a plurality of images in the knowledge graph library using the first image feature extraction model.

It will be noted that the painting library and the knowledge graph library each store a plurality of images therein. In a case where image features of both the images in the painting library and the images in the knowledge graph library are extracted using the first image feature extraction model, the category and the number of labels of the extracted image features are the same as the category and the number of labels of the extracted image feature of the first original image. A dimension of each feature code in the first feature code library and a dimension of each feature code in the second feature code library are the same as a dimension of the first feature code.

In S320, a distance between the first feature code and each feature code in the first feature code library and the second feature code library is calculated, and feature codes corresponding to distances in a preset range are acquired and all acquired feature codes are taken as a first target feature code set.

The distance includes a plurality of types, which may be selectively set according to actual requirements. For example, the distance is the Hamming distance, or the distance is the Euclidean distance.

Here, the preset range has different meanings according to the difference of the set types of the distance.

For example, the distance is the Hamming distance, and in this case, the preset range may be 0 to 5. The Hamming distance refers to the number of different characters in corresponding positions between two character strings. That is, the Hamming distance is a natural number. In this case, the Hamming distance may be 0, 1, 2, 3, 4 or 5.

For example, the distance is the Euclidean distance, and in this case, the preset range may be 0 to 5. The Euclidean distance refers to a real distance between two points in an m-dimensional space (m is a positive integer), and in this case, the Euclidean distance may be any value from 0 to 5. For example, the Euclidean distance is 0, 1, $\sqrt{2}$, $\sqrt{3}$, 2, $\sqrt{5}$, $\sqrt{6}$, 3 or 5.

The following will be illustrated in an example in which the distance is the Hamming distance and the distance between the first feature code and each feature code in the first feature code library is calculated.

After the first feature code is obtained, the first feature code may be compared to all feature codes in the first feature code library sequentially, so as to determine whether characters in corresponding positions between the first feature code and each feature code in the first feature code library are the same and record the number of positions of different characters. The number of the positions of different characters is the Hamming distance between the first feature code and each feature code in the first feature code library.

For example, the first feature code is 1011101, and a feature code in the first feature code library is 1001001. It will be seen from the two feature codes that a third bit of the first feature code is different from a third bit of the feature code in the first feature code library, a fifth bit of the first feature code is different from a fifth bit of the feature code in the first feature code library, and characters of remaining corresponding positions are the same. Thus, the Hamming distance between the first feature code 1011101 and the feature code 1001001 in the first feature code library is 2.

For example, the first feature code is 1011101, and a feature code in the first feature code library is 0001001. It will be seen from the two feature codes that a first bit of the first feature code is different from a first bit of the feature code in the first feature code library, the third bit of the first feature code is different from a third bit of the feature code in the first feature code library, the fifth bit of the first feature code is different from a fifth bit of the feature code in the first feature code library, and characters of remaining corresponding positions are the same. Thus, the Hamming distance between the first feature code 1011101 and the feature code 0001001 in the first feature code library is 3.

In the above two examples, the Hamming distance between the first feature code 1011101 and the feature code 1001001 in the first feature code library is less than the Hamming distance between the first feature code 1011101 and the feature code 0001001 in the first feature code library. That is, the number of the same characters in corresponding positions between the first feature code 1011101 and the feature code 1001001 in the first feature code library is greater than the number of the same characters in corresponding positions between the first feature code 1011101 and the feature code 0001001 in the first feature code library. Therefore, the feature code 1001001 in the first feature code library is more similar to the first feature code 1011101 than the feature code 0001001 in the first feature code library, and thus an image corresponding to the feature code 1001001 in the first feature code library is more similar to the first original image.

Thus, the greater the distance between the first feature code and the feature code in the first feature code library, the lower a similarity between the captured object corresponding to the first original image and the image corresponding to the feature code in the first feature code library. The smaller the distance between the first feature code and the feature code in the first feature code library, the higher the similarity between the captured object corresponding to the first original image and the image corresponding to the feature code in the first feature code library. In a case where the distance between the first feature code and the feature code in the first feature code library is 0, the captured object corresponding to the first original image and the image corresponding to the feature code in the first feature code library are the same.

It will be noted that a calculation of the distance between the first feature code and each feature code in the second feature code library is the same as a calculation of the distance between the first feature code and each feature code in the first feature code library, which may refer to the above schematic description of the calculation of the distance between the first feature code and each feature code in the first feature code library and will not be described in detail here.

In the S320, after the distance between the first feature code and each feature code in the first feature code library and the second feature code library is calculated, the feature codes corresponding to the distances in the preset range may be acquired, and all the acquired feature codes are taken as the first target feature code set.

The preset range refers to a preset range of the distance between the first feature code and each feature code in the first feature code library and the second feature code library. An upper limit value of the preset range may be selectively set according to actual requirements. For example, the upper limit value of the preset range is 5, that is, the preset range is 0 to 5. In this case, feature codes corresponding to distances, in the range of 0 to 5, each between the first feature code and each feature code in the first feature code library and the second feature code library may be extracted and taken as the first target feature code set.

In some examples, the S320 further includes: after the distance between the first feature code and each feature code in the first feature code library and the second feature code library is calculated, sorting the calculated distances according to magnitudes of the distances.

Sorting the calculated distances according to the magnitudes of the distances includes: sorting the calculated distances in ascending order, or sorting the calculated distances in descending order. In this way, the distances in the preset range and feature codes corresponding thereto may be directly acquired from a beginning or an end of a sequence list obtained by sorting. Moreover, the similarity between the image corresponding to each feature code and the captured object corresponding to the first original image may be intuitively understood according to an arrangement order.

In some examples, before the distances are sorted by magnitudes thereof, the S320 further includes: in a process of calculating the distance between the first feature code and each feature code in the first feature code library and the second feature code library, deleting a feature code corresponding to a distance, greater than the upper limit value of the preset range, between the first feature code and each feature code in the first feature code library and the second feature code library. Thus, it may help reduce a subsequent workload of sorting distances and improve an efficiency of the image retrieval method.

In S330, the first target information is determined according to the first target feature code set.

For example, the first target information may be a list constituted of names of the images, and a corresponding image may be found in the painting library and/or the knowledge graph library according to the first target information. For example, a name of each image corresponds to an image store address, and the image may be found according to the image store address.

As another example, the first target information may also be link addresses where the images are stored. An image stored in each link address is an image corresponding to the first target feature code set.

Here, the first target feature code set is obtained according to the first feature code library and the second feature code library. Therefore, the first target feature code set may only be feature codes in the first feature code library, and in this case, the first target information corresponds to names (or stored link addresses) of part of images in the painting library. Alternatively, the first target feature code set may only be feature codes in the second feature code library, and in this case, the first target information corresponds to names (or stored link addresses) of part of images in the knowledge graph library. Alternatively, part of the first target feature code set is the feature codes in the first feature code library, the other part of the first target feature code set is the feature codes in the second feature code library, and in this case, the first target information corresponds to the names (or the stored link addresses) of the part of images in the painting library, and also corresponds to the names (or the stored link addresses) of the part of images in the knowledge graph library.

In the embodiments of the present disclosure, the first feature code library and the second feature code library are established, and after the image feature of the first original image is extracted to obtain the first feature code, the distance between the first feature code and each feature code in the first feature code library and the second feature code library is calculated to select and acquire the feature codes corresponding to the distances in the preset range as the first target feature code set, so that the first target information is determined according to the first target feature code set. In this way, compared to directly comparing an original image to each painting in the painting library and the knowledge graph library, it is beneficial to reduce a comparing difficulty and improve a retrieval accuracy.

In S400, a first target painting set corresponding to the first target information is obtained by searching in the painting library and/or the knowledge graph library according to the first target information.

Since the painting library and the knowledge graph library each store the plurality of images therein, after the first target information is determined, images with names (or stored link addresses) that are the same as the first target information may be searched in the painting library and the knowledge graph library according to the first target information, and images obtained by searching are the first target painting set.

It will be noted that the number of images included in the first target painting set may be selectively set according to actual requirements. For example, the number of the images included in the first target painting set is 5, 10 or 20.

In some examples, in the images included in the first target painting set, there may be one image that is the same as the captured object corresponding to the first original image, this image may be referred to as a hit painting, and the remaining images are similar to the captured object corresponding to the first original image. Alternatively, the images included in the first target painting set are all similar to the captured object corresponding to the first original image, and in this case, the first target painting set does not include the hit painting.

In the images included in the first target painting set, if there is one image that is the same as the captured object corresponding to the first original image (i.e., the hit painting is included), retrieval and searching for the captured object may be achieved in a case where relevant information such as a name and an author of the captured object is unknown. In the first target painting set obtained by searching, the remaining images are similar to the captured object corresponding to the first original image, so that a user may be provided with an opportunity to appreciate images similar to the captured object corresponding to the first original image, thereby being convenient for the user to compare and learn the images.

Figure 5:
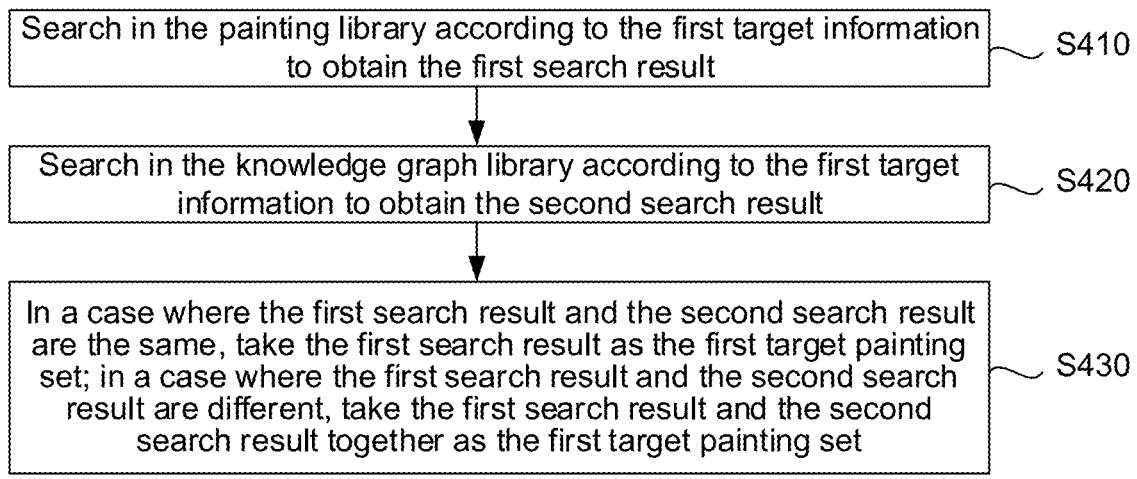
FIG. 5 is a flow diagram of S400 in the image retrieval method shown in FIG. 3.

In some examples, as shown in FIG. 5, considering a relationship between the first target information and both the name (or the stored link address) of the image in the painting library and the name (or the stored link address) of the image in the knowledge graph library, in the S400, searching in the painting library and/or the knowledge graph library for the first target painting set corresponding to the first target information according to the first target information, so as to obtain the first target painting set, includes S410 to S430.

In S410, a first search result is obtained by searching in the painting library according to the first target information.

In S420, a second search result is obtained by searching in the knowledge graph library according to the first target information.

In some embodiments, a process of searching in the painting library according to the first target information to obtain the first search result may include: finding a name of a corresponding image in the painting library according to the first target information, finding a store address of the corresponding image according to the name of the corresponding image, and then finding the corresponding image according to the store address of each image, so as to form the first search result.

Similarly, the second search result may also be formed through the above method, which will not be repeated.

For example, in a case where the first target information only corresponds to the names (or the stored link addresses) of the part of images in the painting library, the first search result is the part of images in the painting library, and the second search result is none.

For example, in a case where the first target information only corresponds to the names (or the stored link addresses) of the part of images in the knowledge graph library, the first search result is none, and the second search result is the part of images in the knowledge graph library.

For example, in a case where the first target information corresponds to the names (or the stored link addresses) of the part of images in the painting library, and also corresponds to the names (or the stored link addresses) of the part of images in the knowledge graph library, the first search result is the part of images in the painting library, and the second search result is the part of images in the knowledge graph library.

It will be noted that the S410 and the S420 may be performed simultaneously, or the S410 may be performed before the S420, or the S420 may be performed before the S410, which is not limited in the examples.

In S430, in a case where the first search result and the second search result are the same, the first search result is taken as the first target painting set. In a case where the first search result and the second search result are different, the first search result and the second search result are taken together as the first target painting set.

For example, the first search result and the second search result are the same, that is, the part of images obtained by searching in the painting library are the same as the part of images obtained by searching in the knowledge graph library. In this case, the part of images obtained by searching in the painting library may be taken as the first target painting set. Thus, it may avoid duplication of images in the first target painting set.

For example, the first search result and the second search result are not completely the same, that is, the part of images obtained by searching in the painting library are different from the part of images obtained by searching in the knowledge graph library. In this case, a union set of the part of images obtained by searching in the painting library and the part of images obtained by searching in the knowledge graph library may be taken as the first target painting set. Thus, it may ensure integrity of the images in the first target painting set.

In addition, in a case where the first search result is some images in the painting library, the second search result is some images in the knowledge graph library, parts of the some images in the painting library and the some images in the knowledge graph library are the same, and the other parts of the some images in the painting library and the some images in the knowledge graph library are different, one of the same parts of the some images in the painting library and the some images in the knowledge graph library may be eliminated, and the rest parts of the some images in the painting library and the some images in the knowledge graph library may be taken as the first target painting set.

By determining the first search result and the second search result after the first search result and the second search result are obtained by searching, it is convenient to ensure the integrity of the first target painting set obtained by retrieval using the image retrieval method provided by the embodiments of the present disclosure, and to prevent a part of images in the first target painting set obtained by retrieval from duplicating.

In some embodiments, in a case where the first search result and the second search result are different or partially the same, the first target painting set may be determined by the following method.

In a case where the first search result includes the hit painting, the first search result is taken as the first target painting set; the hit painting is a painting with a highest similarity to the first original image among paintings corresponding to the first target information. For example, a captured object included in the first target painting set is the same as the captured object in the first original image.

In a case where the first search result does not include the hit painting and the second search result includes the hit painting, the first search result and the hit painting are together taken as the first target painting set.

In a case where neither the first search result nor the second search result includes the hit painting, the first search result is taken as the first target painting set.

In some embodiments, whether the first search result is the same as the second search result may be determined by comparing the names of the images.

In S500, the first target painting set is output.

After the first target painting set is obtained by searching, the first target painting set can be output.

The image retrieval method provided by some embodiments of the present disclosure is combined with the painting library and the knowledge graph library. The first original image is acquired, and the first feature code is obtained by performing the image feature extraction thereon, so that target paintings that are the same as or similar to the captured object corresponding to the first original image can be obtained by retrieval in the painting library or the knowledge graph library according to the first feature code, thereby achieving the retrieval of a painting in a case where the relevant information such as the name and the author of the painting is unknown to the user.

In some examples, before the S100, the image retrieval method further includes: performing data processing on the first original image. Here, the data processing may include a plurality of ways.

In some examples, the data processing includes correction processing. For example, the correction processing includes using a background removal algorithm and a gradient correction algorithm to correct the first original image that does not match a material object due to reasons such as a shooting angle or a shooting position. The correction processing is performed on the first original image, which is beneficial to improving an accuracy of a result of the retrieval performed by a cloud device according to the first original image.

In some other examples, the data processing includes compression processing. The compression processing is performed on the first original image, a transmission speed of the first original image sent from the terminal device to the cloud device may be improved, and distortion of the first original image may be avoided.

In yet other examples, the data processing includes the correction processing and the compression processing. In this case, the correction processing may be firstly performed on the first original image, and then the compression processing may be performed on the correction-processed first original image. As for beneficial effects of performing the data processing on the first original image, reference may be made to the beneficial effects of the above two examples.

In some embodiments, in addition to storing the plurality of images, the painting library and the knowledge graph library each further store information corresponding to respective images stored therein.

In some examples, in the S400, in a process of searching in the painting library and/or the knowledge graph library for the first target painting set corresponding to the first target information according to the first target information to obtain the first target painting set, information corresponding to the first target painting set may also be obtained by searching. The information includes relevant information of the first target painting set. For example, the information may include authors, styles or collection sites of the first target painting set.

In some examples, after the S500, the terminal device may display the first target painting set.

Figure 9:
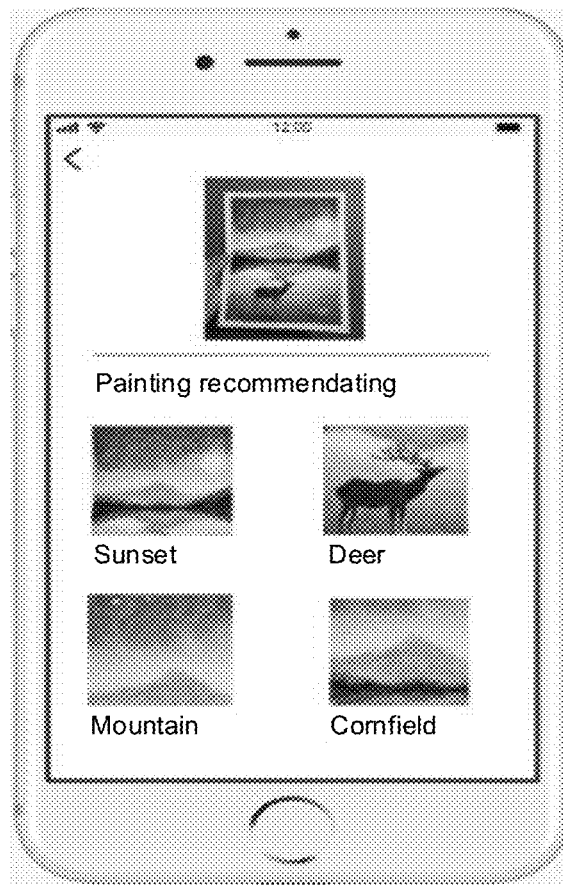
FIG. 9 is an interface diagram of a first target painting set displayed by a terminal device, in accordance with some embodiments of the present disclosure.

For example, as shown in FIG. 9, considering an area of a display screen of the terminal device and an area occupied by each image on the display screen in a process of displaying the first target painting set, only one, two, three or five images can be displayed on the display screen, and the remaining target paintings can be displayed by an operation of scrolling pages up and down or an operation of turning page by whole screen. Here, display of the first target painting set by the terminal device may be referred to as a first-stage display.

In some examples, after the first target painting set is displayed by the terminal device, the terminal device may, in response to a selection operation of the user, search for information corresponding to a selected image in the painting library or the knowledge graph library, and display the information of the selected image.

Figure 10:
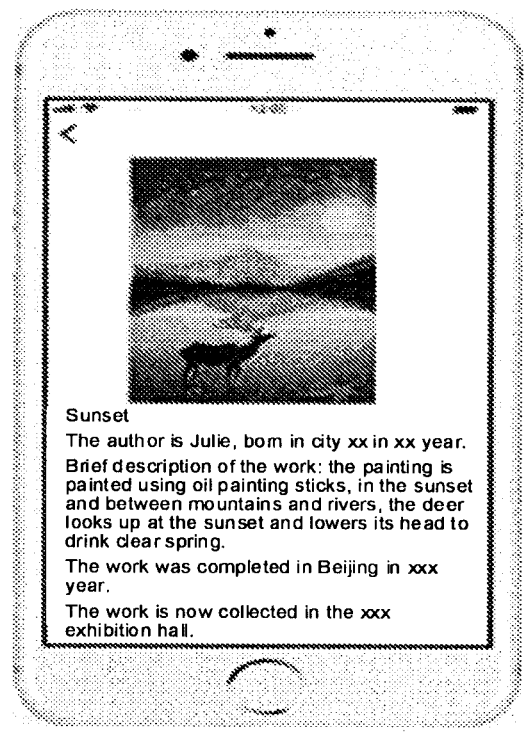
FIG. 10 is an interface diagram of information of a first target painting set displayed by a terminal device, in accordance with some embodiments of the present disclosure.

For example, in the first-stage display, the terminal device only displays at least one image in the first target painting set. As shown in FIG. 10, after the first-stage display, if the user wants to know about information of a certain image, the user can select (for example, select by clicking on the display screen of the terminal device) this image from at least one image displayed by the terminal device. The terminal device may, in response to the selection operation of the user, cause an image displayed on the display screen to jump and display the information of the selected image.

Here, display of the information of the selected image by the terminal device may be referred to as a second-stage display.

In some examples, after the information of the selected image is displayed by the terminal device, the terminal device may, in response to a question operation of the user, send a questioned key field to the image retrieval device. The information of each image includes at least one key field, and each key field in the at least one key field includes an information entity.

For example, the information of the certain image includes "an author is Zhang San, a style is oil painting, and it is collected in the National Art Museum of China", and thus key fields include Zhang San, the oil painting or the National Art Museum of China. Here, Zhang San, the oil painting or the National Art Museum of China is the information entity.

After the second-stage display, if the user wants to further know about some information (e.g., a detailed introduction of Zhang San) in the information of the selected image, the user can select one key field (i.e., asking questioning for information you want to know). The terminal device may, in response to the question operation of the user, send the questioned key field to the image retrieval device.

In some examples, the image retrieval device may obtain information corresponding to the questioned key field according to the knowledge graph library, and send the information to the terminal device.

After the questioned key field is received by the image retrieval device, the image retrieval device can search in the knowledge graph library for information in relationship to the questioned key field (i.e., the information corresponding to the questioned key field), so as to obtain the information.

The information corresponding to the questioned key field is a detailed introduction of the questioned key field. The information corresponding to the questioned key field corresponds to the questioned key field, which means that the information corresponding to the questioned key field corresponds to the questioned key field through the relationship. The relationship includes but is not limited to, a date of birth, a place of birth, a work or a style of the work.

For example, the questioned key field is Zhang San, and the information corresponding to the questioned key field includes: xx (the month) xx (the day), xx (the year) corresponding to Zhang San through the date of birth, Beijing corresponding to Zhang San through the place of birth, One, Two and Three corresponding to Zhang San through the work, or the pastoralism corresponding to Zhang San through the style of the work.

Figure 11:
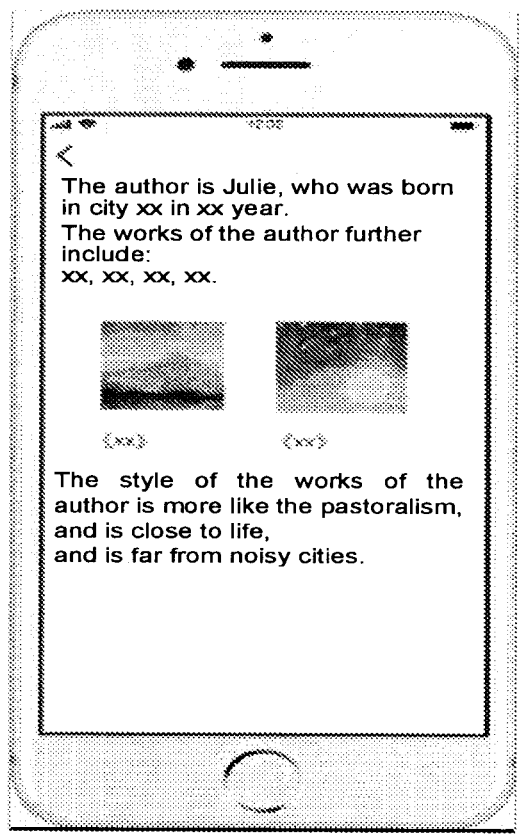
FIG. 11 is an interface diagram of information corresponding to questioned key fields displayed by a terminal device, in accordance with some embodiments of the present disclosure.

In some examples, as shown in FIG. 11, after the information corresponding to the questioned key field is received by the terminal device, the terminal device will display the information. Thus, retrieval of an image and retrieval and understanding of information of the image may be achieved in a case where relevant information such as the name and the author of the image is unknown. Here, display of the information corresponding to the questioned key field by the terminal device may be referred to as a three-stage display.

In the image retrieval method provided by some embodiments of the present disclosure, by combining with the knowledge graph library, the information corresponding to the questioned key field in the information of the selected image can be fed back when the question operation of the user about the information of the selected image is received, so that the user is able to further know about the relevant information of the retrieved image, thereby further understanding the retrieved image.

In addition, after the information corresponding to the questioned key field is displayed by the terminal device, the terminal device may further respond to the question operation of the user to perform the above steps cyclically and sequentially, so as to further know about the information corresponding to the questioned key field. In this way, the embodiments of the present disclosure can respond to and feed on the question operation of the user step by step in combination with the knowledge graph library, so that the user may fully understand the retrieved image.

In some embodiments, the image retrieval method further includes: storing, by the image retrieval device, at least one of the first original image and questioned key fields.

In some examples, the questioned key fields include a questioned key field in at least one question operation.

The retrieval of the at least one of the first original image and the questioned key fields by the user can be taken as a log of the user. In this way, storage of the log of the user may be achieved by storing the at least one of the first original image and the questioned key fields, which is convenient for the user to repeat retrieving and understanding the retrieved contents in the subsequent.

In some examples, the user needs to register a user name when using the terminal device. The image retrieval device will further store the user name of the user while storing the log of the user, so that the user name of each user can correspond to the log thereof, which is convenient to management of the log of each user.

In some embodiments, the image retrieval method further includes: according to the knowledge graph library, obtaining relevant information corresponding to the at least one of the first original image and the stored questioned key fields, and sending the relevant information to the terminal device. The relevant information includes similar target painting(s) and/or similar target information that are similar to the at least one of the stored first original image and the stored questioned key fields.

After the at least one of the first original image and the questioned key fields is stored by the image retrieval device, the image retrieval device can obtain the relevant information corresponding to the at least one of the first original image and the questioned key fields according to the relationship in the knowledge graph library. Thus, recommendation of information related to the log of the user may be achieved.

For example, if the image retrieval device stores the first original image, the relevant information corresponding to the first original image may be obtained through the relationship in the knowledge graph library, and the relevant information includes the similar target painting(s) and/or the similar target information that are similar to the first original image.

Figure 6:
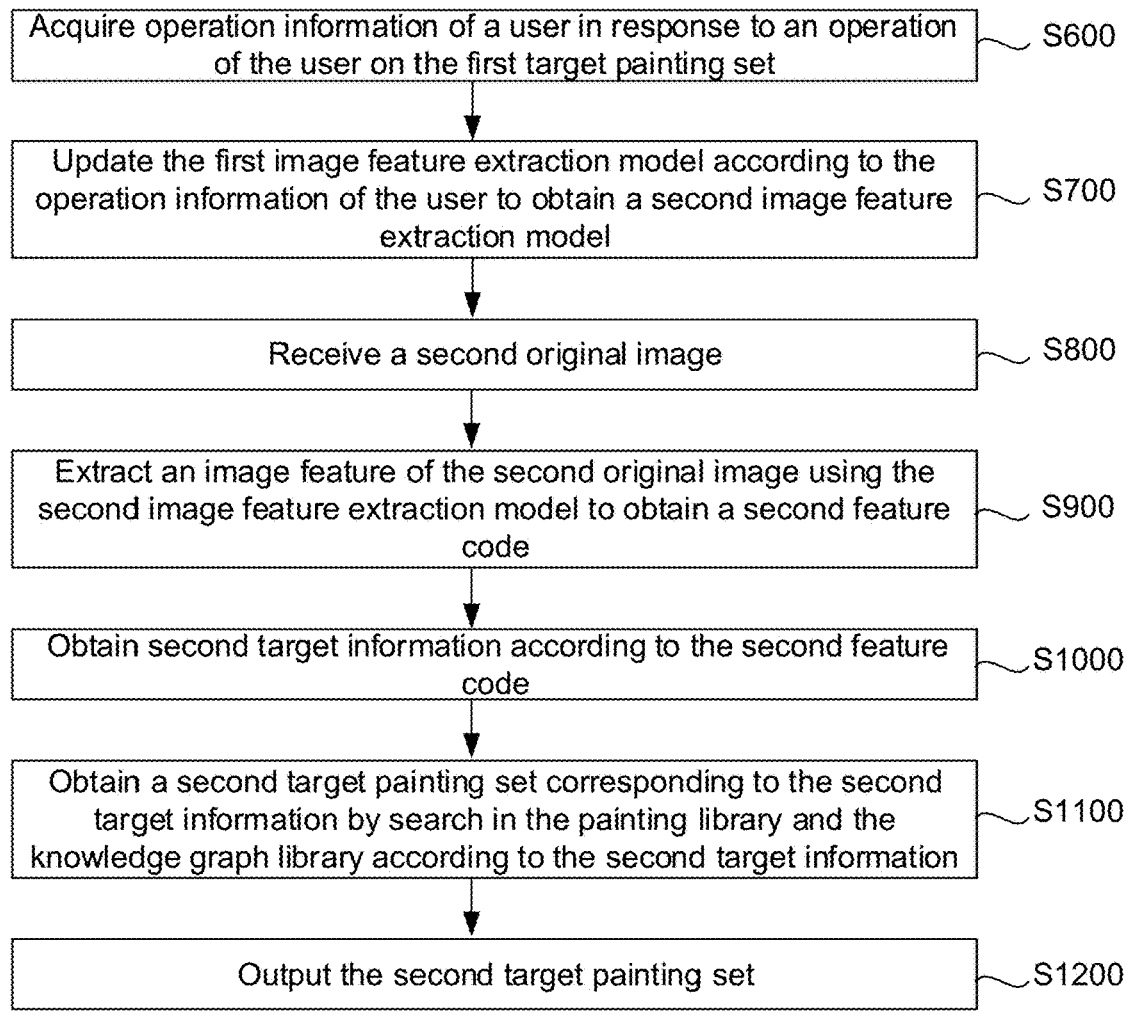
FIG. 6 is a flow diagram of another image retrieval method, in accordance with some embodiments of the present disclosure.

In some embodiments, as shown in FIG. 6, the image retrieval method further includes S600 to S1200.

In S600, operation information of the user is acquired in response to an operation of the user on the first target painting set.

The operation information of the user refers to a content record of information interaction between the user and the image retrieval device through the terminal device.

For example, the operation of the user on the first target painting set is the selection operation or the question operation, and the operation information of the user is the log of the user.

For example, the acquired operation information of the user may be operation information of the user within a period of time. For example, the period of time may be one month, two weeks, one week or one day, which may be selected and set according to actual requirements.

In S700, the first image feature extraction model is updated according to the operation information of the user to obtain a second image feature extraction model.

In S800, a second original image is received.

In S900, an image feature of the second original image is extracted using the second image feature extraction model to obtain a second feature code.

In S1000, second target information is obtained according to the second feature code.

In S1100, a second target painting set corresponding to the second target information is obtained by searching in the painting library and the knowledge graph library according to the second target information.

In S1200, the second target painting set is output.

Here, processes of searching to obtain the second target painting set and outputting the second target painting set in S800 to S1200 may refer to a description of processes of searching to obtain first target painting set and outputting the first target painting set in S100 to S500, and will not be described here.

Figure 7:
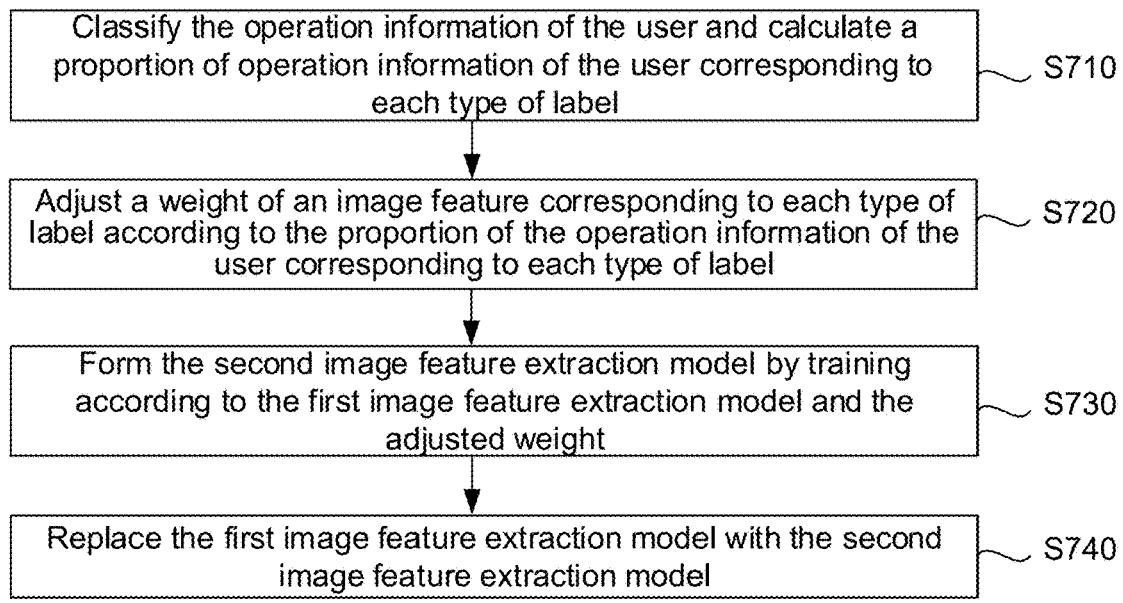
FIG. 7 is a flow diagram of S700 in the image retrieval method shown in FIG. 6.

In some embodiments, as shown in FIG. 7, in the S700, updating the first image feature extraction model according to the operation information of the user to obtain the second image feature extraction model, includes S710 to S740.

In S710, the operation information of the user is classified, and a proportion of operation information of the user corresponding to each type of label is calculated.

For example, classifying the operation information of the user may include: providing a plurality of labels, and labeling corresponding operation information of the user with at least one label. Each label represents a type of operation information. For example, the plurality of labels may be: more relevant works, brief descriptions of authors, market prices of the works, etc.

Based on that the user generally has a content of interest or a content of less interest, in the operation information of the user, proportions of operation information of the user corresponding to different types of label may be different. For example, a proportion of operation information of the user corresponding to a label that the user is very interested in may be relatively large, and a proportion of operation information of the user corresponding to a label that the user is less interested in may be relatively small.

In S720, a weight of an image feature corresponding to each type of label is adjusted according to the proportion of the operation information of the user corresponding to each type of label.

Here, in the first image feature extraction model, a sum of weights of image features corresponding to all types of labels is 1. For example, a weight of an image feature corresponding to a label "type" is 50%, and a weight of an image feature corresponding to a label "content" is 50%.

For example, in the S710, a proportion of operation information of the user corresponding to the label "type" is calculated to be 70%, and a proportion of operation information of the user corresponding to the label "content" is calculated to be 30%. In this case, the weights of the image features respectively corresponding to the label "type" and the label "content" may be adjusted. For example, the weight of the image feature corresponding to the label "type" is adjusted from 50% to 70%, and the weight of the image feature corresponding to the label "content" is adjusted from 50% to 30%.

In S730, the second image feature extraction model is formed by training according to the first image feature extraction model and the adjusted weight.

After the weight of the image feature corresponding to each type of label is adjusted, the second image feature extraction model can be formed by training in combination with the first image feature extraction model. The second image feature extraction model is a feature extraction model of a deep learning model.

In S740, the first image feature extraction model is replaced with the second image feature extraction model.

For example, in a process of replacing the first image feature extraction model with the second image feature extraction model, the first image feature extraction model may be replaced according to a path in which the first image feature extraction model is stored.

Figure 8:
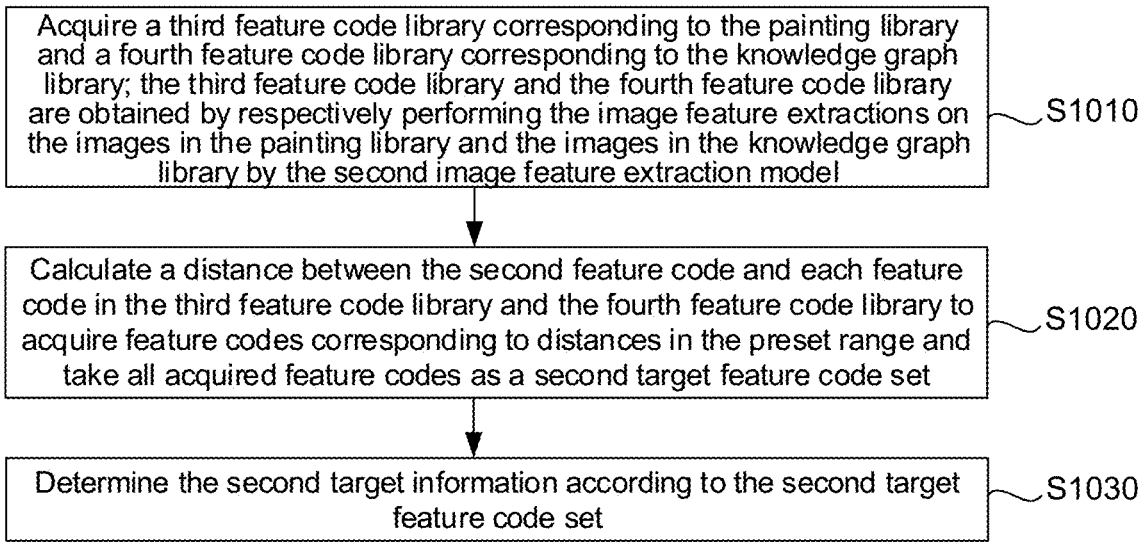
FIG. 8 is a flow diagram of S1000 in the image retrieval method shown in FIG. 6.

In some embodiments, as shown in FIG. 8, in the S1000, obtaining the second target information according to the second feature code, includes S1010 to S1030.

In S1010, a third feature code library corresponding to the painting library and a fourth feature code library corresponding to the knowledge graph library are acquired. The third feature code library and the fourth feature code library are obtained by respectively performing image feature extractions on the images in the painting library and the images in the knowledge graph library using the second image feature extraction model.

For example, the third feature code library is a feature code library obtained by performing an image feature extraction on the plurality of images in the painting library using the second image feature extraction model, and the fourth feature code library is a feature code library obtained by performing an image feature extraction on the plurality of images in the knowledge graph library using the second image feature extraction model.

In some examples, in the second image feature extraction model, the weight of the image feature corresponding to the label "type" is 70%, and the weight of the image feature corresponding to the label "content" is 30%. In this case, in the third feature code library and the fourth feature code library obtained using the second image feature extraction model, a proportion of a feature code corresponding to the label "type" may be 70%, and a proportion of a feature code corresponding to the label "content" may be 30%.

In S1020, a distance between the second feature code and each feature code in the third feature code library and the fourth feature code library is calculated, and feature codes corresponding to distances in the preset range are acquired and all acquired feature codes are taken as a second target feature code set.

For example, a process of acquiring the second target feature code set may refer to the content described in the S320, which will not be described in detail here.

In S1030, the second target information is determined according to the second target feature code set.

For example, a process of determining the second target information according to the second target feature code set may refer to the content described in the S330, which will not be described in detail here.

In some embodiments, since paintings are continually created, the number of paintings will continually increase. In this way, the painting library may be updated for multiple times to make paintings stored in the painting library comprehensive. Moreover, in some examples, it is difficult for the painting library to include all paintings existing in the world, and thus in a process of retrieving an original image, the target paintings obtained by retrieving may all be paintings similar to a painting corresponding to the original image. By updating the painting library, the above situation may be reduced or even avoided, so that the target paintings obtained by retrieving have a painting the same as the painting corresponding to the original image as much as possible.

Thus, in some examples, the image retrieval method further includes: in response to an update operation of the user, sending an update request to the image retrieval device by the terminal device; and updating the painting library by the image retrieval device according to the update request.

Since the first feature code library is obtained by extracting an image feature of each painting in the painting library, the first feature code library may further be updated after the painting library is updated.

The image retrieval method provided by the embodiments of the present disclosure is described above. It can be understood that in combination with steps of exemplary methods described by some embodiments herein, the present disclosure may be implemented in a form of hardware or in a form of a combination of hardware and computer software. Whether a certain function is performed by the hardware or by computer software driving hardware depends on a specific application of the technical solution and restrictive conditions on design. A skilled person may implement the described function for each specific application using different ways, but such implementation should not be considered beyond the scope of the present disclosure.

In order to implement the above method or function, some embodiments of the present disclosure further provide the image retrieval device for implementing the above image retrieval method, and an image retrieval system including the image retrieval device and the terminal device. The image retrieval device and the image retrieval system including the image retrieval device and the terminal device will be exemplarily described below.

The embodiments of the present disclosure may divide the image retrieval device into functional modules according to the above embodiments of the method. For example, the functional modules may be divided corresponding to the functions, or two or more functions may be integrated into one processing module. The above integrated module may be implemented in a form of hardware, or in a form of a software functional module. It will be noted that the division of modules in the embodiments of the present disclosure is illustrative, and is merely a logic function division, and there may be other division manners in practical implementations.

Figure 12A:
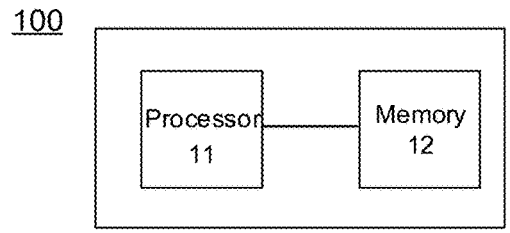
FIG. 12A is a structural diagram of an image retrieval device, in accordance with some embodiments of the present disclosure.
Figure 13A:
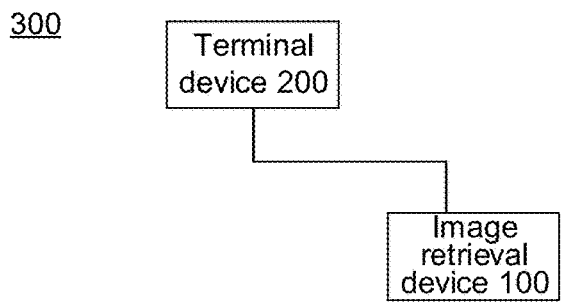
FIG. 13A is a structural diagram of an image retrieval system, in accordance with some embodiments of the present disclosure.

In a case where an integrated unit is used, as shown in FIGS. 12A and 13A, the image retrieval device 100 and the image retrieval system 300 are schematically described below.

As shown in FIG. 12A, the image retrieval device 100 includes a processor 11 and a memory 12. The memory 12 stores program instructions, and the program instructions are executed by the processor 11 to make the image retrieval device 100 perform the following operations: the S100 to the S500.

For example, the processor 11 may include one or more processing units. For example, the processor 11 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be separate devices or may be integrated in one or more processors.

The memory 12 may be provided separately from and coupled to the processor 11. The memory 12 may also be provided in the processor 11 for storing instructions and data. In some embodiments, the memory in the processor is a cache memory, and the memory may hold instructions or data that the processor has just used or reused. If the processor needs to reuse the instructions or the data, it can directly call the instructions or the data from the memory. Thus, repeated access may be avoided, which may reduce waiting time of the processor, and improve efficiency of the system.

Beneficial effects that can be achieved by the image retrieval device 100 provided by some embodiments of the present disclosure are the same as beneficial effects that can be achieved by the image retrieval method provided by some embodiments mentioned above, which will not be described in detail here.

In some examples, in the S200, the image retrieval device 100 further performs the following operations: extracting the image feature of the first original image using the first image feature extraction model to obtain the first feature code.

In some examples, in the S300, in a process of obtaining the first target information according to the first feature code, the image retrieval device 100 further performs the following operations: the S310 to the S330.

In some examples, in the S400, in a process of searching in the painting library and/or the knowledge graph library for the first target painting set corresponding to the first target information according to the first target information to obtain the first target painting set, the image retrieval device 100 further performs the following operations: the S410 to the S430.

In some embodiments, the image retrieval device 100 further performs the following operations: the S600 to the S1200.

In some examples, in the S700, in a process of updating the first image feature extraction model according to the operation information of the user to obtain the second image feature extraction model, the image retrieval device 100 further performs the following operations: the S710 to the S740.

In some examples, in the S1000, in a process of obtaining the second target information according to the second feature code, the image retrieval device 100 further performs the following operations: the S1010 to the S1030.

Figure 12B:
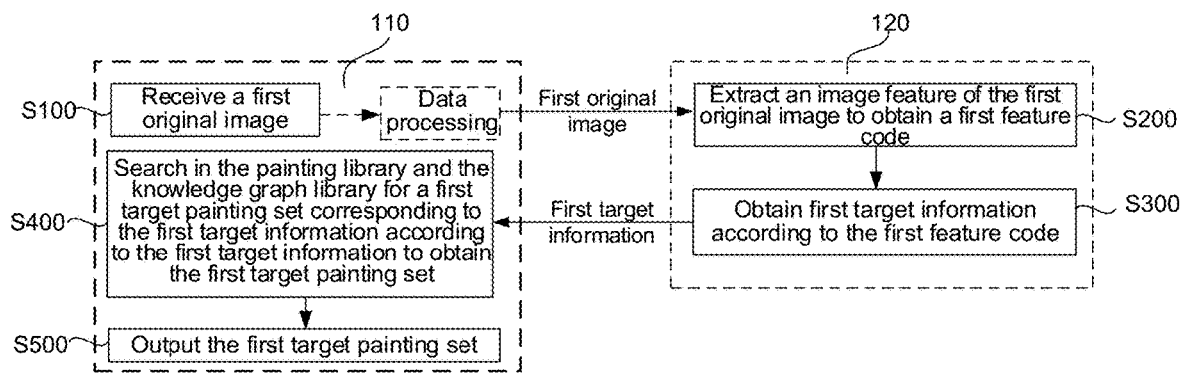
FIG. 12B is a flow diagram of an image retrieval device performing an image retrieval method, in accordance with some embodiments of the present disclosure.
Figure 13B:
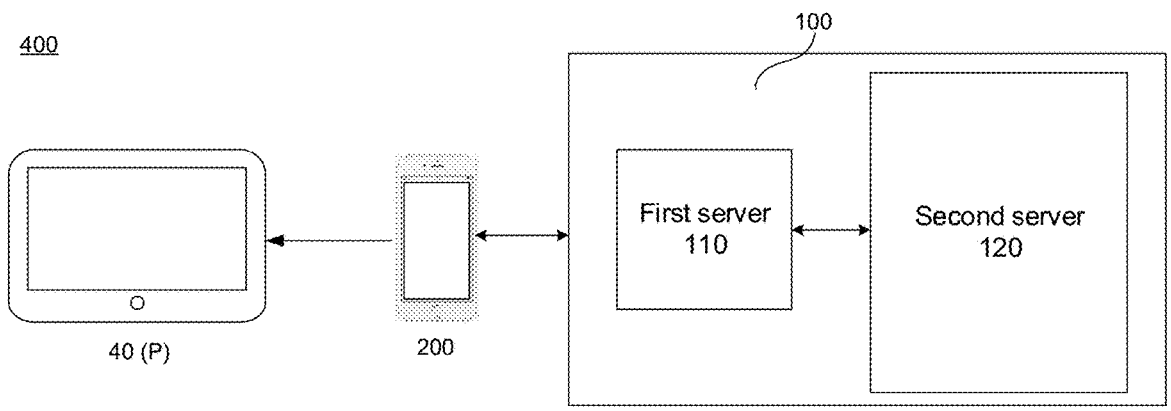
FIG. 13B is a structural diagram of an image display system and an image retrieval device, in accordance with some embodiments of the present disclosure.

In some embodiments, as shown in FIGS. 12B and 13B, the image retrieval device 100 includes a first server 110 and a second server 120. The first server may be, for example, a middle server, and the second server may be a cloud server. By providing two servers, it can be ensured that different functions are set on different servers, so that in a case where one server has a problem, functions on the other server can still work normally.

In some examples, the first server may store the painting library, and the second server may store the knowledge graph library.

Referring to FIG. 12B, in some examples, the first server 110 is configured to receive a first original image and send the first original image to the second server 120. Alternatively, the first server 110 is configured to receive the first original image, perform data processing on the first original image and send the data-processed first original image to the second server 120.

The second server 120 is configured to receive the first original image sent by the first server 110, extract an image feature of the first original image to obtain a first feature code, and obtain first target information according to the first feature code.

The first server 110 is configured to search in the painting library and/or the knowledge graph library for a first target painting set corresponding to the first target information according to the first target information, so as to obtain the first target painting set; and output the first target painting set.

The first server is further configured to receive the first target information send by the second server, and search in the painting library for a first search result corresponding to the first target information according to the first target information to obtain the first search result.

The second server is further configured to search in the knowledge graph library for a second search result corresponding to the first target information according to the first target information to obtain the second search result.

In the case where the first search result and the second search result are the same, the first search result is taken as the first target painting set. In the case where the first search result and the second search result are different, a union set of the first search result and the second search result is taken as the first target painting set.

In some embodiments, the first server is further configured to: search in the painting library according to the first target information to obtain the first search result, and search in the knowledge graph library according to the first target information to obtain the second search result.

In the case where the first search result includes the hit painting, the first search result is taken as the first target painting set; in the case where the first search result does not include the hit painting and the second search result includes the hit painting, the first search result and the hit painting are taken together as the first target painting set; and in the case where neither the first search result nor the second search result includes the hit painting, the first search result is taken as the first target painting set.

In some embodiments, the second server is further configured to compare the first search result with the second search result.

In some embodiments, the image retrieval device 100 is further configured to acquire operation information of a user in response to an operation of the user on the first target painting set.

The operation information of the user refers to a question operation of the user for a displayed painting and information of the painting. For example, the operation information of the user includes a keyword clicked by the user and the number of times of clicking a corresponding keyword.

The image retrieval device 100 is further configured to update the first image feature extraction model according to the operation information of the user to obtain a second image feature extraction model.

The image retrieval device 100 is further configured to receive a second original image; extract an image feature of the second original image using the second image feature extraction model to obtain a second feature code; obtain second target information according to the second feature code; search in the painting library and the knowledge graph library for a second target painting set corresponding to the second target information according to the second target information to obtain the second target painting set; and output the second target painting set.

In some embodiments, the second server is further configured to acquire the operation information of the user in response to the operation of the user on the first target painting set, and update the first image feature extraction model according to the operation information of the user to obtain the second image feature extraction model.

The first server is further configured to receive the second original image and send the second original image to the second server.

The second server is further configured to extract the image feature of the second original image using the second image feature extraction model to obtain the second feature code; obtain the second target information according to the second feature code; and transmit the second target information to the first server.

The first server is further configured to search in the painting library and the knowledge graph library for the second target painting set corresponding to the second target information according to the second target information, so as to obtain the second target painting set; and output the second target painting set.

In some embodiments, the second server is further configured to classify the operation information of the user and calculate a proportion of the operation information of the user corresponding to each type of label; adjust a weight of an image feature corresponding to each type of label according to the proportion of the operation information of the user corresponding to each type of label; form the second image feature extraction model by training according to the first image feature extraction model and an image feature, a weight of which is adjusted; and replace the first image feature extraction model with the second image feature extraction model.

As shown in FIG. 13A, the image retrieval system 300 includes the terminal device 200 and the image retrieval device 100 provided by some embodiments mentioned above.

The terminal device 200 includes a plurality of types, which are not limited in the embodiments of the present disclosure, as long as the image can be captured and displayed. For example, the terminal device may be a device such as a mobile phone, a tablet computer, a PC (Personal Computer) or a notebook. Alternatively, the terminal device may be a device such as a camera, a mobile phone, a tablet computer, a PC (Personal Computer) or a notebook that is electrically connected to a painting screen.

In the embodiments of the present disclosure, the terminal device is configured to capture the first original image and upload the first original image to the image retrieval device; receive the first target painting set output by the image retrieval device; and output the first target painting set in response to the operation of the user.

The terminal device may be coupled to a painting display terminal to form an image display system (also referred to as a display system), so as to display the first target painting set on the painting display terminal. The painting display terminal refers to a device capable of displaying paintings. For example, a size of the painting display terminal is larger than a size of the terminal device. As another example, a display effect of the painting display terminal is better than a display effect of the terminal device. For example, the painting display terminal is the painting screen.

For example, referring to FIG. 13B, considering an example in which the terminal device 200 is the mobile phone and the painting display terminal 40 is the painting screen P, the terminal device 200 may be coupled to the image retrieval device 100 and configured to send the first original image to the image retrieval device 100 and receive the first target information, etc. In addition, the terminal device 200 may further be coupled to the painting screen P to form the image display system (i.e., the display system 400), so that the retrieved paintings can be displayed on the painting screen P. The embodiments of the present disclosure do not limit a coupling manner between the terminal device 200 and the painting screen P. For example, the terminal device 200 and the painting screen P may be coupled through bluetooth or Wireless-Fidelity (Wi-Fi).

Figure 13C:
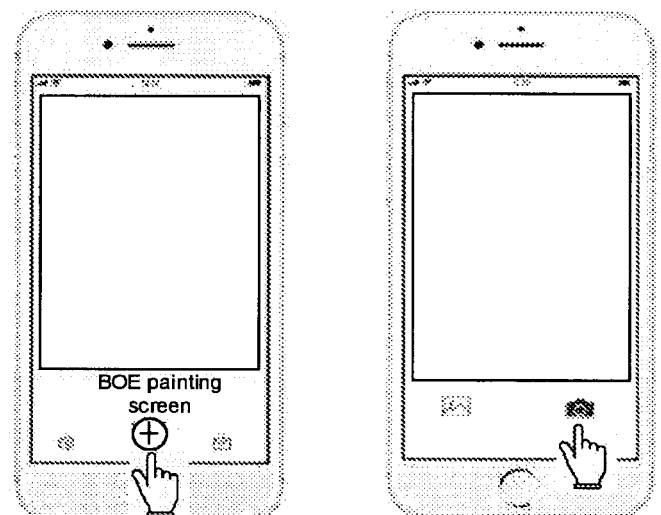
FIG. 13C is a diagram showing an operation interface of a terminal device, in accordance with some embodiments of the present disclosure.
Figure 13C:
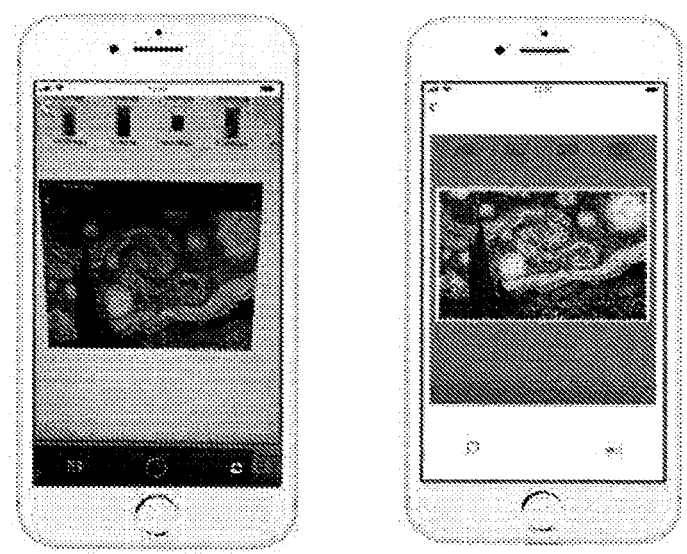

For example, the user may operate on the terminal device 200, so as to achieve functions of retrieving paintings and acquiring relevant information. For example, the terminal device 200 may include a painting appreciation applet. Referring to FIG. 13C, after the user clicks to enter the painting appreciation applet, the terminal device 200 will display an initial interface as shown in (a) of FIG. 13C. When the user finds a painting of interest and wants to appreciate the painting on the painting screen, the user can achieve this purpose through the following operations. Firstly, a button of "adding an image" is clicked, for example, an icon, to which the finger points, in (a) of FIG. 13C is clicked to enter an image acquisition interface shown in (b) of FIG. 13C. On this interface, the user can acquire a photograph of an image to be appreciated from a storage system (e.g., an album) of the terminal device 200, or take a living shoot of the image to be appreciated. Considering the live shooting as an example, a "camera" icon in (b) of FIG. 13C is clicked to enter a shooting interface shown in (c) of FIG. 13C and a photograph is taken. In this case, the painting appreciation applet will automatically identify a painting in the photograph and retrieve relevant paintings in the image retrieval device 300, and as shown in FIG. 9, a retrieved target painting and similar paintings will be displayed on the terminal device 200. Then, the user may further continue to click on these paintings or words in brief descriptions of these paintings, so as to acquire more relevant information, that is, question these displayed paintings and the relevant information thereof.

In some embodiments, the terminal device 200 and the image retrieval device 100 may communicate through a network, which may include various connection types such as a wired or wireless communication link, or an optical fiber cable.

In some embodiments, the terminal device 200 is configured to capture the first original image and upload the first original image to the image retrieval device 100.

The image retrieval device 100 is configured to receive the first original image, and extract the image feature of the first original image to obtain the first feature code.

The image retrieval device 100 is further configured to obtain the first target information according to the first feature code.

The image retrieval device 100 is further configured to search in the painting library and the knowledge graph library for the first target painting set corresponding to the first target information according to the first target information to obtain the first target painting set.

The image retrieval device 100 is further configured to output the first target painting set.

The terminal device 200 is further configured to display the first target painting set.

Beneficial effects that can be achieved by the image retrieval system 300 provided by some embodiments of the present disclosure are the same as beneficial effects that can be achieved by the image retrieval device 100 and the terminal device 200 provided by some embodiments mentioned above, which will not be described in detail here.

The terminal device 200 is further configured to display the second target painting set.

In some embodiments, the image retrieval device 100 is further configured to classify the operation information of the user and calculate the proportion of the operation information of the user corresponding to each type of label.

The image retrieval device 100 is further configured to adjust the weight of the image feature corresponding to each type of label according to the proportion of the operation information of the user corresponding to each type of label The image retrieval device 100 is further configured to form the second image feature extraction model by training according to the first image feature extraction model and the image feature, a weight of which is adjusted.

The image retrieval device 100 is further configured to replace the first image feature extraction model with the second image feature extraction model.

Figure 14:
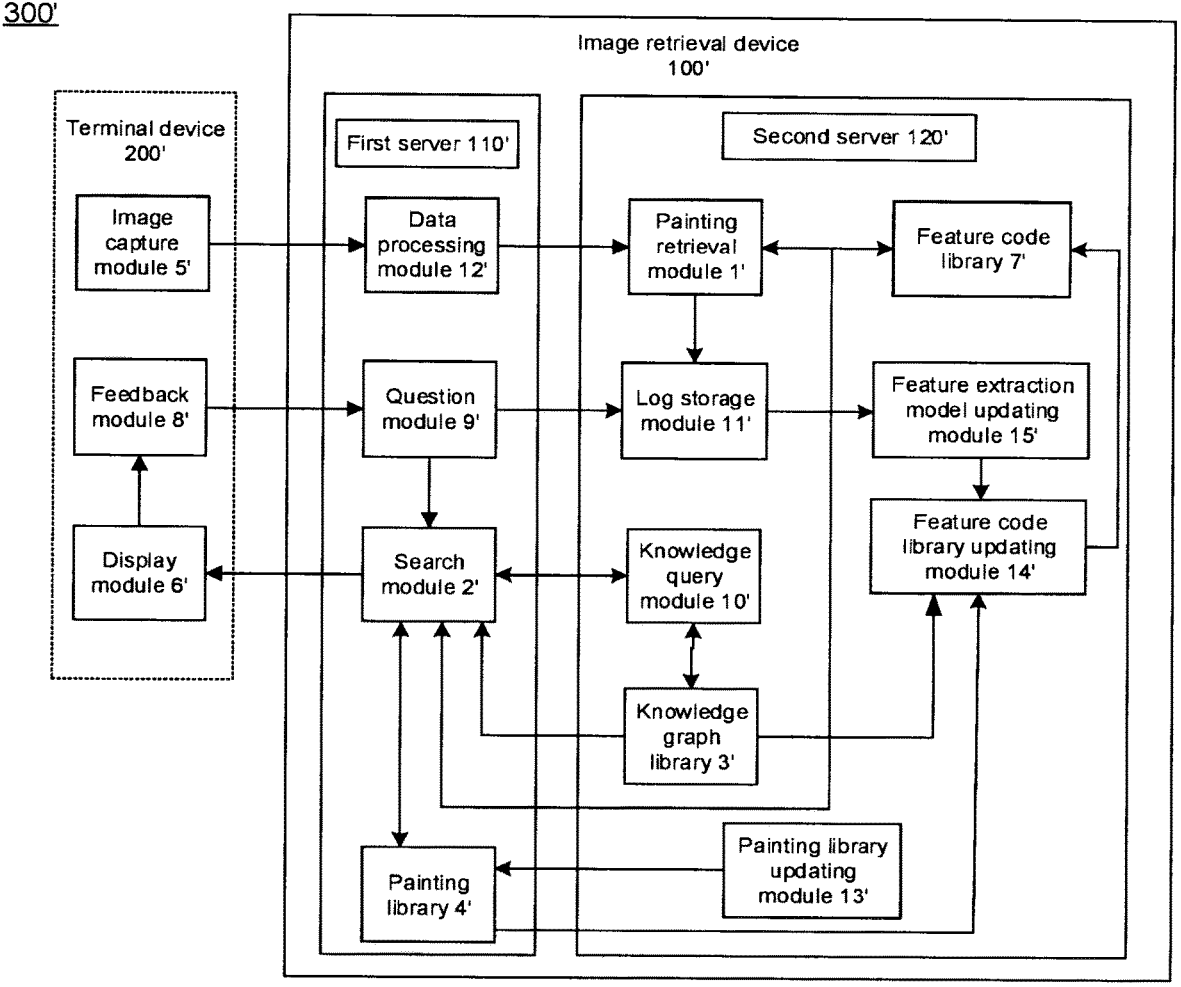
FIG. 14 is a structural diagram of another image retrieval system, in accordance with some embodiments of the present disclosure.

In a case where functional modules are divided corresponding to functions, as shown in FIG. 14, the image retrieval device 100' and the image retrieval system 300' including the terminal device 200' and the image retrieval device 100' will be respectively and schematically described below.

As shown in FIG. 14, the image retrieval device 100' includes a painting retrieval module 1', a search module 2', the knowledge graph library 3' and the painting library 4'. The terminal device 200' includes an image capture module 5' and a display module 6'.

In some examples, the image capture module 5' is configured to capture the first original image and upload the first original image to the image retrieval device 100'.

In some examples, the painting retrieval module 1' is configured to receive the first original image, extract the image feature of the first original image to obtain the first feature code, and obtain the first target information according to the first feature code.

In some examples, the search module 2' is configured to search in the painting library 4' and the knowledge graph library 3' for the first target painting set corresponding to the first target information according to the first target information to obtain the first target painting set; and output the first target painting set.

In some examples, the display module 6' is configured to display the first target painting set. In some examples, the display module 6' may be the display screen. For example, the display screen may be a liquid crystal display (LCD) screen or an organic light-emitting diode (OLED) display screen. For example, the display screen may be a display screen having a touch function, which is convenient for the user to perform the selection operation and the question operation by touching the display screen.

In some embodiments, as shown in FIG. 14, the image retrieval device 100' further includes a feature code library 7'. The feature code library 7' includes the first feature code library and the second feature code library, and is configured to store a feature code, obtained by the first image feature extraction model, in each painting in the painting library and the knowledge graph library.

In some examples, the painting retrieval module 1' is further configured to calculate the distance between the first feature code and each feature code in the first feature code library and the second feature code library, acquire the feature codes corresponding to the distances in the preset range and take the acquired feature codes as the first target feature code set; and determine the first target information according to the first target feature code set.

In some examples, the search module 2' is further configured to obtain a retrieval result list according to the first target information, and search in the painting library 4' and the knowledge graph library 3' according to the retrieval result list to obtain the first target painting set. The retrieval result list includes names of paintings corresponding to the first target painting set.

In some examples, the search module 2' is further configured to search in the knowledge graph library 3' to obtain the information corresponding to the first target painting set.

In some examples, the display module 6' is further configured to display the information corresponding to the first target painting set.

In some embodiments, as shown in FIG. 14, the terminal device 200' further includes a feedback module 8'. The feedback module 8' is configured to in response to the question operation of the user, send the questioned key field to the image retrieval device 100'.

In some embodiments, as shown in FIG. 14, the image retrieval device 100' further includes a question module 9'. The question module 9' is configured to receive the questioned key field and send the questioned key field to the search module 2'.

In some embodiments, as shown in FIG. 14, the image retrieval device 100' further includes a knowledge query module 10'. The knowledge query module 10' is configured to receive the questioned key field sent by the search module 2', search according to the knowledge graph library 3' to obtain the information corresponding to the questioned key field, and send the information to the search module 2'.

In some embodiments, the search module 2' is further configured to search in the painting library 4' to obtain the information corresponding to the questioned key field.

In some examples, the search module 2' is further configured to send the information corresponding to the questioned key field to the terminal device 200'.

In some examples, the display module 6' is further configured to display the information corresponding to the questioned key field.

In some embodiments, as shown in FIG. 14, the image retrieval device 100' further includes a log storage module 11'. The log storage module 11' is configured to receive the first original image sent by the painting retrieval module 1', receive the questioned key field sent by the question module 9', and store at least one of the first original image and the questioned key field.

In some embodiments, as shown in FIG. 14, the image retrieval device 100' further includes a data processing module 12'. The data processing module 12' is configured to receive the first original image sent by the image capture module 5', perform the data processing on the first original image, and send the data-processed first original image to the painting retrieval module 1'. Here, the data processing includes the correction processing and/or the compression processing.

In some embodiments, the image retrieval device 100' further includes a painting library updating module 13'. The painting library updating module 13' is configured to update the painting library 4'.

In some embodiments, the image retrieval device 100' further includes a feature code library updating module 14'. The feature code library updating module 14' is configured to update the first feature code library in the feature code library 7' after the painting library 4' is updated.

In some embodiments, the feature code library updating module 14' is further configured to update the second feature code library in the feature code library 7' after the knowledge graph library 3' is updated.

In some embodiments, the image retrieval device 100' further includes a feature extraction model updating module 15'. The feature extraction model updating module 15' is configured to update the feature code library updating module 14' according to information in the log storage module 11'.

It will be noted that a structure of the image retrieval device 100' provided by some embodiments mentioned above includes a plurality of types, which are not limited in the embodiments of the present disclosure, as long as the functions mentioned in the above embodiments can be achieved.

In some embodiments, as shown in FIG. 14, the image retrieval device 100' includes a first server 110' and a second server 120'. The first server 110' may include the search module 2', the painting library 4', the question module 9' and the data processing module 12', and the second server 120' may include the painting retrieval module 1', the knowledge graph library 3', the feature code library 7', the knowledge query module 10', the log storage module 11', the painting library updating module 13', the feature code library updating module 14' and the feature extraction model updating module 15'.

Hereinafter, a structure of the second server 120' is schematically described by considering an example in which the second server 120' is the cloud server which has built a Graphic Processing Unit (GPU) Docker and/or a Central Processing Unit (CPU) Docker therein.

Figure 15:
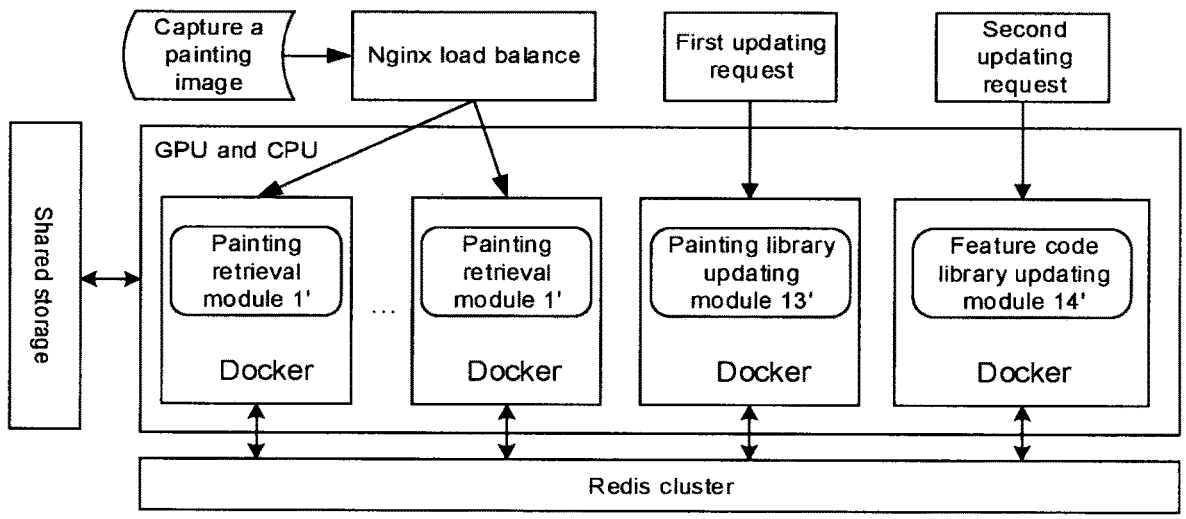
FIG. 15 is a structural diagram of a cloud server deployment scheme, in accordance with some embodiments of the present disclosure.

As shown in FIG. 15, a deployment scheme of the cloud server is as follows.

Firstly, the GPU Docker and/or the CPU Docker are built in a container cloud platform based on Kubernetes (abbreviated as K8S). Here, depending on a computation speed required by the container cloud platform, the CPU Docker, the GPU Docker, or both the GPU Docker and the CPU Docker may be built in the container cloud platform.

For example, the GPU Docker and the CPU Docker are both built in the container cloud platform.

After both the GPU Docker and the CPU Docker are built in the container cloud platform, input or output application programming interfaces (abbreviated as APIs) for invoking a painting retrieval algorithm, a painting library updating algorithm, a log storage algorithm and the knowledge graph library are deployed in the GPU Docker and the CPU Docker. The number of GPU Docker and CPU Docker that are used may correspondingly increase or decrease according to load capacities and performance indexes of hardware resources. A deployment of each algorithm adopts a Docker deployment scheme of combining the GPU Docker and the CPU Docker, which can effectively evaluate a utilization efficiency of the hardware resources, thereby facilitating an arithmetic transplantation and a resource expansion.

In some examples, a Nginx load balance is provided between the GPU Docker and the CPU Docker, and an effect of the Nginx load balance is: the greater the number of accesses per unit of time of a server, the greater pressure borne by the server, and the server will crash when pressure borne by the server is large enough to exceed a bearing capacity of the server. By providing the Nginx load balance, the pressure borne by the server can be shared to prevent the server from crashing, so that the user can have a good experience.

A method of sharing the pressure borne by the server by providing the Nginx load balance is: building a server cluster including a plurality of servers (e.g., the server is a Docker including the painting retrieval module 1' or a Docker including the painting library updating module 13'), and an middle server (e.g., the Nginx load balance). Thus, when the user accesses the server cluster, an access request may be firstly sent to the middle server, so that the middle server can select a server with a less pressure among the server cluster and import the access request to this server. By the above accessing manner, a pressure borne by each server among the server cluster can tend to be balanced, so that a situation that the pressure borne by the server is so large that the server crashes can be avoided.

For example, after the first original image is captured and sent to the image retrieval device 100' by the terminal device 200', the image retrieval device 100' may select a certain server with a less pressure (i.e., the Docker including the painting retrieval module 1') through the Nginx load balance, and send the first original image to this server retrieve the first original image. Thus, it can be avoided that requests of retrieving the first original images that are generated by the terminal device 200' are concentrated in one server to cause the server to crash.

In some examples, as shown in FIG. 15, an update of the painting library and an update of the first feature code library may be achieved by interacting with a Redis cluster. Thus, in a process of updating the painting library and/or updating the first feature code library, it is not necessary to restart the server.

Figure 16:
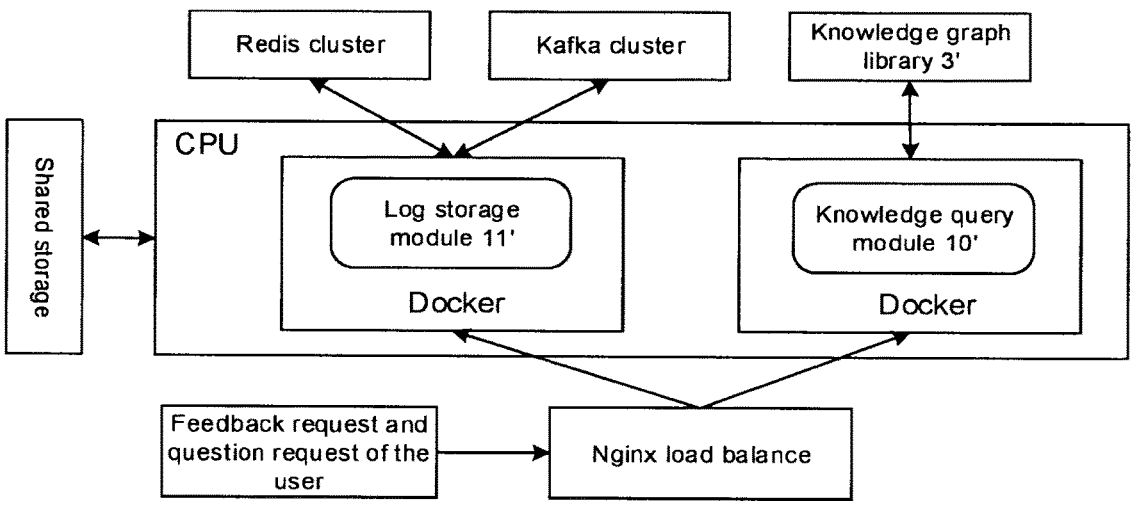
FIG. 16 is a structural diagram of a scheme of user feedback, knowledge graph search and log storage, in accordance with some embodiments of the present disclosure.

In some examples, as shown in FIG. 16, the storage of the log of the user (i.e., a retrieval record of the user) may be achieved by interacting with a kafka cluster. For a feedback request and/or a question request of the user for information of the first original image displayed by the terminal device, knowledge in the knowledge graph library 3' may be invoked by the knowledge query module 10', and the invoked knowledge may be fed back to the user. In addition, through the log storage module 11', bundling and storing of the feedback request of the user and the user name of the user may be completed by interacting with the kafka cluster.

In addition, shared storages shown in FIGS. 15 and 16 are used to store code data of each algorithm and a model file invoked by each algorithm.

In some embodiments, the above functional modules included by the terminal device 200' may be integrated in mobile software in the terminal device 200'. By running an application program (abbreviated as APP) in the mobile software, the functions need to be achieved by the terminal device 200' can be achieved.

Some embodiments of the present disclosure provide a computer-readable storage medium (e.g., a non-transitory computer-readable storage medium) that has stored computer program instructions thereon that, when run on the processor, cause the processor to perform one or more steps of the image retrieval method as described in any of the above embodiments. The above computer-readable storage medium may be, for example, a non-transitory computer-readable storage medium.

For example, the computer-readable storage medium may include, but is not limited to: a magnetic storage device (e.g., a hard disk, a floppy disk or a magnetic tape), an optical disk (e.g., a compact disk (CD), a digital versatile disk (DVD)), a smart card, a flash memory device (e.g., an erasable programmable read-only memory (EPROM), a card, a stick or a key driver). Various computer-readable storage media described in the embodiments of the present disclosure may represent one or more devices and/or other machine-readable storage media, which are used for storing information. The term "machine-readable storage medium" may include, but is not limited to, wireless channels and various other media capable of storing, containing and/or carrying instructions and/or data.

Some embodiments of the present disclosure further provide a computer program product. The computer program product includes computer program instructions that, when executed by a computer, cause the computer to perform one or more steps of the image retrieval method as described in the above embodiments.

Some embodiments of the present disclosure further provide a computer program. When executed by a computer, the computer program causes the computer to perform one or more steps of the image retrieval method as described in the above embodiments.

Beneficial effects of the computer-readable storage medium, the computer program product and the computer program are the same as the beneficial effects of the image retrieval method as described in some embodiments mentioned above, which will not be described in detail here.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. An image retrieval method, comprising:
receiving a first original image;
extracting an image feature of the first original image to obtain a first feature code, the first feature code being a string of numbers in binary;
obtaining first target information according to the first feature code, the first target information including a name, a serial number, or a store address of at least one image;
searching in at least one of a painting library and a knowledge graph library for a first target painting set corresponding to the first target information according to the first target information, so as to obtain the first target painting set; and
outputting the first target painting set.

2. The image retrieval method according to claim 1, wherein
extracting the image feature of the first original image to obtain the first feature code, includes:
extracting the image feature of the first original image using a first image feature extraction model to obtain the first feature code; and
the image retrieval method further comprises:
acquiring operation information of a user in response to an operation of the user on the first target painting set;
updating the first image feature extraction model according to the operation information of the user to obtain a second image feature extraction model;
receiving a second original image;
extracting an image feature of the second original image using the second image feature extraction model to obtain a second feature code;
obtaining second target information according to the second feature code;
searching in the painting library and the knowledge graph library for a second target painting set corresponding to the second target information according to the second target information, so as to obtain the second target painting set; and
outputting the second target painting set.

3. The image retrieval method according to claim 2, wherein
updating the first image feature extraction model according to the operation information of the user to obtain the second image feature extraction model, includes:
classifying the operation information of the user;
calculating a proportion of operation information of the user corresponding to each type of label;
adjusting a weight of an image feature corresponding to each type of label according to the proportion of the operation information of the user corresponding to each type of label;
forming the second image feature extraction model by training according to the first image feature extraction model and the adjusted weight; and
replacing the first image feature extraction model with the second image feature extraction model.

4. The image retrieval method according to claim 2, wherein
obtaining the second target information according to the second feature code, includes:
calculating a distance between the second feature code and each feature code in a third feature code library and a fourth feature code library;
acquiring feature codes corresponding to distances in a preset range and taking the acquired feature codes as a second target feature code set; and
determining the second target information according to the second target feature code set;
wherein the third feature code library is a feature code library obtained by performing an image feature extraction on a plurality of images in the painting library using the second image feature extraction model; the fourth feature code library is a feature code library obtained by performing the image feature extraction on a plurality of images in the knowledge graph library using the second image feature extraction model.

5. The image retrieval method according to claim 1, wherein
obtaining the first target information according to the first feature code, includes:
calculating a distance between the first feature code and each feature code in a first feature code library and a second feature code library;
acquiring feature codes corresponding to distances in a preset range and taking the acquired feature codes as a first target feature code set; and
determining the first target information according to the first target feature code set;
wherein the first feature code library is a feature code library obtained by performing an image feature extraction on a plurality of images in the painting library using a first image feature extraction model; and the second feature code library is a feature code library obtained by performing the image feature extraction on a plurality of images in the knowledge graph library using the first image feature extraction model.

6. The image retrieval method according to claim 1, wherein
searching in the at least one of the painting library and the knowledge graph library for the first target painting set corresponding to the first target information according to the first target information, so as to obtain the first target painting set, includes:
searching in the painting library according to the first target information to obtain a first search result;
searching in the knowledge graph library according to the first target information to obtain a second search result;
if the first search result includes a hit painting, taking the first search result as the first target painting set; the hit painting being a painting with a highest similarity to the first original image among paintings corresponding to the first target information;
if the first search result does not include the hit painting and the second search result includes the hit painting, taking the first search result and the hit painting together as the first target painting set; and
if neither the first search result nor the second search result includes the hit painting, taking the first search result as the first target painting set.

7. The image retrieval method according to claim 1, wherein
searching in the at least one of the painting library and the knowledge graph library for the first target painting set corresponding to the first target information according to the first target information, so as to obtain the first target painting set, includes:

searching in the painting library according to the first target information to obtain a first search result;

searching in the knowledge graph library according to the first target information to obtain a second search result;

if the first search result and the second search result are same, taking the first search result as the first target painting set; and if the first search result and the second search result are not completely same, taking a union set of the first search result and the second search result as the first target painting set.

8. An image retrieval device configured to perform the image retrieval method according to claim 1, the image retrieval device comprising a processor and a memory, wherein the memory stores program instructions, and the program instructions are executed by the processor.

9. An image retrieval system, comprising:

an image retrieval device configured to perform the image retrieval method according to claim 1; and a terminal device configured to capture the first original image and upload the first original image to the image retrieval device, receive the first target painting set output by the image retrieval device, and display the first target painting set in response to an operation of a user.

10. An image display system, comprising an image retrieval device, a terminal device and a painting display terminal, wherein the image retrieval device is configured to perform the image retrieval method according to claim 1;

the terminal device is configured to capture the first original image and upload the first original image to the image retrieval device, receive the first target painting set output by the image retrieval device, and output the first target painting set to the painting display terminal in response to an operation of a user; and the painting display terminal is configured to display the first target painting set.

11. A non-transitory computer-readable storage medium having stored thereon computer program instructions that, when run on a processor, cause the processor to perform the image retrieval method according to claim 1.

12. An image retrieval device having stored a painting library and a knowledge graph library therein, the image retrieval device comprising a first server and a second server wherein the first server is configured to: receive a first original image and send the first original image to the second server;

the second server is configured to: receive the first original image sent by the first server; extract an image feature of the first original image to obtain a first feature code; and obtain first target information according to the first feature code and transmit the first target information to the first server, wherein the first feature code is a string of numbers in binary, and the first target information includes a name, a serial number, or a store address of at least one image; and the first server is further configured to: receive the first target information transmitted by the second server; search in at least one of a painting library and a knowledge graph library for a first target painting set corresponding to the first target information according to the first target information, so as to obtain the first target painting set; and output the first target painting set.

13. The image retrieval device according to claim 12, wherein the first server is further configured to perform data processing on the received first original image and send the data-processed first original image to the second server.

14. The image retrieval device according to claim 12, wherein the second server is further configured to:

extract the image feature of the first original image using a first image feature extraction model to obtain the first feature code.

15. The image retrieval device according to claim 12, wherein the second server is further configured to: acquire operation information of a user in response to an operation of the user on the first target painting set; and update a first image feature extraction model according to the operation information of the user to obtain a second image feature extraction model;

the first server is further configured to: receive a second original image and send the second original image to the second server;

the second server is further configured to: extract an image feature of the second original image using the second image feature extraction model to obtain a second feature code; obtain second target information according to the second feature code; and transmit the second target information to the first server;

the first server is further configured to: search in the painting library and the knowledge graph library for a second target painting set corresponding to the second target information according to the second target information, so as to obtain the second target painting set; and output the second target painting set.

16. The image retrieval device according to claim 15, wherein the second server is further configured to:

classify the operation information of the user and calculate a proportion of operation information of the user corresponding to each type of label;

adjust a weight of an image feature corresponding to each type of label according to the proportion of the operation information of the user corresponding to each type of label;

form the second image feature extraction model by training according to the first image feature extraction model and an image feature, a weight of which is adjusted; and replace the first image feature extraction model with the second image feature extraction model.

17. The image retrieval device according to claim 12, wherein the first server is further configured to:

search in the painting library according to the first target information to obtain a first search result;

search in the knowledge graph library according to the first target information to obtain a second search result;

in a case where the first search result includes a hit painting that is a painting with a highest similarity to the first original image among paintings corresponding to the first target information, take the first search result as the first target painting set;

in a case where the first search result does not include the hit painting and the second search result includes the hit painting, take the first search result and the hit painting together as the first target painting set; and in a case where neither the first search result nor the second search result includes the hit painting, take the first search result as the first target painting set.

18. The image retrieval device according to claim 12, wherein
the first server is further configured to: search in the painting library according to the first target information to obtain a first search result;
search in the knowledge graph library according to the first target information to obtain a second search result;
in a case where the first search result and the second search result are same, take the first search result as the first target painting set; and
in a case where the first search result and the second search result are not completely same, take a union set of the first search result and the second search result as the first target painting set.

\* \* \* \* \*